(12) United States Patent
Kandekar et al.

(10) Patent No.: US 9,002,701 B2
(45) Date of Patent: Apr. 7, 2015

(54) METHOD, SYSTEM, AND COMPUTER READABLE MEDIUM FOR GRAPHICALLY DISPLAYING RELATED TEXT IN AN ELECTRONIC DOCUMENT

(75) Inventors: Kunal Kandekar, Jersey City, NJ (US); Scott Curtis, Durham, NC (US); Hugh Svendsen, Chapel Hill, NC (US)

(73) Assignee: Rhonda Enterprises, LLC, Wilmington, DE (US)

( * ) Notice: Subject to any disclaimer, the term of this patent is extended or adjusted under 35 U.S.C. 154(b) by 204 days.

(21) Appl. No.: 13/239,363

(22) Filed: Sep. 21, 2011

(65) Prior Publication Data
US 2012/0078613 A1   Mar. 29, 2012

Related U.S. Application Data

(60) Provisional application No. 61/387,718, filed on Sep. 29, 2010.

(51) Int. Cl.
G06F 17/27    (2006.01)
G06F 17/30    (2006.01)

(52) U.S. Cl.
CPC ................................ G06F 17/2745 (2013.01)

(58) Field of Classification Search
CPC ............ G06F 17/2775; G06F 17/2785; G06F 17/279; G06F 7/06
USPC .............. 704/1, 7, 9; 707/705, 708, 723, 738, 707/725
See application file for complete search history.

(56) References Cited

U.S. PATENT DOCUMENTS

| | | | |
|---|---|---|---|
| 4,958,284 A | 9/1990 | Bishop et al. | |
| 5,146,552 A | 9/1992 | Cassorla et al. | |
| 5,297,039 A | 3/1994 | Kanaegami et al. | |
| 5,640,552 A | 6/1997 | Yianilos | |
| 5,642,520 A | 6/1997 | Takeshita et al. | |
| 5,708,825 A | 1/1998 | Sotomayer | |
| 5,731,805 A | 3/1998 | Tognazzini et al. | |
| 5,737,599 A * | 4/1998 | Rowe et al. ........................ | 1/1 |
| 5,802,516 A | 9/1998 | Shwarts et al. | |

(Continued)

FOREIGN PATENT DOCUMENTS

| KR | 10-2007-0077174 A | 7/2007 |
|---|---|---|
| KR | 1020070077174 A | 7/2007 |

(Continued)

OTHER PUBLICATIONS

Gelfand et al. "Discovering Concepts in Raw Texts: Building Semantic Relationship Graphs". In ICML/AAAI workshop on learning for text categorization, 1998, pp. 1-10.*

(Continued)

*Primary Examiner* — James Wozniak
(74) *Attorney, Agent, or Firm* — Olive Law Group, PLLC

(57) ABSTRACT

Disclosed herein are systems and methods for navigating electronic texts. According to an aspect, a method may include receiving search criteria for searching an electronic text. Further, the method may include determining text subgroups within the electronic text. The method may also include determining, for each text subgroup, a similarity relationship between the search criteria and the text subgroup. Further, the method may include presenting, for each text subgroup, a graphic representing the similarity relationship between the text subgroup and the search criteria.

20 Claims, 19 Drawing Sheets

(56) References Cited

U.S. PATENT DOCUMENTS

| | | | |
|---|---|---|---|
| 6,052,657 A | 4/2000 | Yamron et al. | |
| 6,070,133 A * | 5/2000 | Brewster et al. | 704/9 |
| 6,154,757 A * | 11/2000 | Krause et al. | 715/205 |
| 6,243,071 B1 | 6/2001 | Shwarts et al. | |
| 6,353,824 B1 * | 3/2002 | Boguraev et al. | 715/277 |
| 6,529,948 B1 * | 3/2003 | Bowman-Amuah | 709/217 |
| 6,553,310 B1 * | 4/2003 | Lopke | 701/454 |
| 6,638,317 B2 * | 10/2003 | Nakao | 715/255 |
| 6,862,710 B1 | 3/2005 | Marchisio | |
| 6,992,687 B1 | 1/2006 | Baird et al. | |
| 7,103,848 B2 | 9/2006 | Barsness et al. | |
| 7,113,897 B2 | 9/2006 | Shimizu et al. | |
| 7,143,348 B1 * | 11/2006 | Krause | 715/236 |
| 7,158,971 B1 | 1/2007 | Bascom | |
| 7,158,983 B2 | 1/2007 | Willse et al. | |
| 7,185,001 B1 | 2/2007 | Burdick et al. | |
| 7,236,966 B1 | 6/2007 | Jackson et al. | |
| 7,239,747 B2 | 7/2007 | Bresler et al. | |
| 7,340,466 B2 | 3/2008 | Odom et al. | |
| 7,366,715 B2 * | 4/2008 | Liu et al. | 1/1 |
| 7,398,196 B1 | 7/2008 | Liu et al. | |
| 7,398,200 B2 * | 7/2008 | Ie et al. | 704/9 |
| 7,430,504 B2 | 9/2008 | Vanderwende et al. | |
| 7,437,023 B2 | 10/2008 | King et al. | |
| 7,523,103 B2 * | 4/2009 | Goel et al. | 1/1 |
| 7,594,187 B2 | 9/2009 | Baird et al. | |
| 7,693,912 B2 | 4/2010 | Rose et al. | |
| 7,716,077 B1 | 5/2010 | Mikurak | |
| 7,716,224 B2 | 5/2010 | Reztlaff, II et al. | |
| 7,724,696 B1 * | 5/2010 | Parekh | 370/311 |
| 7,774,198 B2 | 8/2010 | Roulland et al. | |
| 7,793,230 B2 | 9/2010 | Burns et al. | |
| 7,809,717 B1 * | 10/2010 | Hoeber et al. | 707/722 |
| 7,849,081 B1 * | 12/2010 | Chang et al. | 707/727 |
| 2001/0044758 A1 * | 11/2001 | Talib et al. | 705/27 |
| 2003/0014674 A1 | 1/2003 | Huffman et al. | |
| 2003/0110181 A1 * | 6/2003 | Schuetze et al. | 707/103 R |
| 2003/0193523 A1 | 10/2003 | Johnson | |
| 2005/0108001 A1 | 5/2005 | Aarskog | |
| 2005/0198070 A1 | 9/2005 | Lowry | |
| 2005/0203918 A1 * | 9/2005 | Holbrook | 707/10 |
| 2005/0246391 A1 | 11/2005 | Gross | |
| 2006/0004704 A1 | 1/2006 | Gross | |
| 2006/0125846 A1 | 6/2006 | Springer et al. | |
| 2006/0156222 A1 | 7/2006 | Chi et al. | |
| 2006/0173985 A1 | 8/2006 | Moore | |
| 2006/0194181 A1 | 8/2006 | Rosenberg | |
| 2007/0025189 A1 | 2/2007 | Wang et al. | |
| 2007/0061128 A1 | 3/2007 | Odom et al. | |
| 2007/0067317 A1 | 3/2007 | Stevenson | |
| 2007/0073745 A1 | 3/2007 | Scott et al. | |
| 2007/0074102 A1 * | 3/2007 | Kraft et al. | 715/512 |
| 2007/0150456 A1 | 6/2007 | Lian et al. | |
| 2007/0168413 A1 | 7/2007 | Barletta et al. | |
| 2007/0219968 A1 | 9/2007 | Frank | |
| 2007/0219986 A1 * | 9/2007 | Egozi | 707/5 |
| 2007/0296556 A1 | 12/2007 | Wang et al. | |
| 2008/0010262 A1 | 1/2008 | Frank | |
| 2008/0010273 A1 | 1/2008 | Frank | |
| 2008/0010605 A1 | 1/2008 | Frank | |
| 2008/0040313 A1 | 2/2008 | Schachter | |
| 2008/0079692 A1 | 4/2008 | Liang et al. | |
| 2008/0141117 A1 | 6/2008 | King et al. | |
| 2008/0231644 A1 | 9/2008 | Lempel et al. | |
| 2008/0243788 A1 | 10/2008 | Reztlaff et al. | |
| 2008/0243805 A1 * | 10/2008 | Gutta et al. | 707/5 |
| 2008/0256108 A1 * | 10/2008 | Heinze et al. | 707/102 |
| 2009/0077658 A1 | 3/2009 | King et al. | |
| 2009/0083027 A1 | 3/2009 | Hollingsworth | 704/9 |
| 2009/0083613 A1 | 3/2009 | Davis | |
| 2009/0248683 A1 * | 10/2009 | Krause | 707/5 |
| 2009/0254572 A1 | 10/2009 | Redlich et al. | |
| 2010/0076274 A1 | 3/2010 | Severson | |
| 2010/0092095 A1 | 4/2010 | King et al. | |
| 2010/0094878 A1 | 4/2010 | Soroca et al. | |
| 2010/0153889 A1 * | 6/2010 | Krause | 715/856 |
| 2010/0174980 A1 | 7/2010 | Mansfield et al. | |
| 2010/0195975 A1 | 8/2010 | Issa et al. | |
| 2011/0066965 A1 | 3/2011 | Choi | |
| 2011/0087955 A1 * | 4/2011 | Ho et al. | 715/230 |
| 2011/0238408 A1 | 9/2011 | Larcheveque et al. | |
| 2011/0261030 A1 | 10/2011 | Bullock | |
| 2012/0078612 A1 | 3/2012 | Kandekar et al. | |
| 2012/0079372 A1 | 3/2012 | Kandekar et al. | |
| 2012/0206472 A1 | 8/2012 | Kandekar et al. | |
| 2012/0210203 A1 | 8/2012 | Kandekar et al. | |

FOREIGN PATENT DOCUMENTS

| | | |
|---|---|---|
| KR | 10-2010-0099925 A | 9/2010 |
| KR | 1020100099925 A | 9/2010 |

OTHER PUBLICATIONS

Chang, B.-W. and Ungar, D., "Animation: From Cartoons to the User Interface," The SML Technical Report Series, Mar. 1995, copyright 1995, Sun Microsystems, Inc., SMLI-TR-95-33, found at <http://labs.oracle.com/techrep/1995/smli_tr-95-33.pdf>, originally published in UIST '93: User Interface Software and Technology, Nov. 1993, 18 pages.

Graesser, A. et al., "Latent Semantic Analysis Captures Causal, Goal-oriented, and Taxonomic Structures," Proc. Int. Conf. CogSci '00, Philadelphia, Pennsylvania, Aug. 13-15, 2000, found at <http://citeseerx.ist.psu.edu/viewdoc/download?doi=10.1.1.23.5444&rep=rep1&type=pdf>, 6 pages.

Hearst, Marti A., "TextTiling: Segmenting Text into Multi-paragraph Subtopic Passages," Computational Linguistics, vol. 23, No. 1, pp. 33-64, Mar. 1997, copyright 1997, Association for Computational Linguistics, 32 pages.

Hon, Dan, "The future is Movie OS," posted Apr. 16, 2010, Extenuating Circumstances weblog, found at <http://danhon.com/2010/04/16/the-future-is-movie-os/>, printed Oct. 26, 2011, 21 pages.

"Illinois Named Entity Tagger," found at <http://cogcomp.cs.illinois.edu/page/software_view/4> on Internet Archive, dated Sep. 7, 2010, copyright 2010, University of Illinois at Urbana-Champaign, printed Oct. 26, 2011, 1 page.

Lopes, Rui, "Time-Based Hypermedia Processing and Pattern System," Departamento de Informatica, Faculdade de Ciencias da Universidade de Lisboa, Portugal, Jun. 2006, 133 pages.

"Named entity recognition," Wikipedia, found at <http://en.wikipedia.org/wiki/Named_Entity_Recognition> on Internet Archive, dated Oct. 19, 2010, page last modified Sep. 23, 2010, printed Oct. 26, 2011, 3 pages.

Ratinov, L. and Roth, D., "Design Challenges and Misconceptions in Named Entity Recognition," Proceedings of the Thirteenth Conference on Computational Natural Language Learning (CoNLL), Boulder, Colorado, Jun. 2009, pp. 147-155, copyright 2009, Association for Computational Linguistics, found at <http://cogcomp.cs.illinois.edu/papers/RatinovRo09.pdf>, 9 pages.

"RunPee.com," found at <http://runpee.com/> on the Internet Archive, dated Nov. 2, 2009, printed Nov. 11, 2011, 1 page.

"Wireless, Whispernet and Whispersync," found at <http://www.amazon.com/gp/help/customer/display.html?nodeId=200375890&#syncing> on Internet Archive, dated Oct. 10, 2009, printed Oct. 26, 2011, 10 pages.

International Search Report and Written Opinion for PCT/US2011/053660, dated Apr. 27, 2012, International Searching Authority, Korean International Property Office, 14 pages.

Organizing and Searching the World Wide Web of Facts—Step Two: Harnessing the Wisdom of the Crowds, Marius Pasca, Google Inc., Mountain View, California, 2007.

Integrated Clustering and Feature Selection Scheme for Text Documents, M. Thangamani et al., Journal of Computer Science 6 (5) : 536-541, 2010.

Butarbutar, M. and McRoy, S., "Indexing Text Documents Based on Topic Identification," Lecture Notes in Computer Science (LNCS), SPIRE 2004, LNCS 3246, Apostolico, A. and Melucci, M. (Eds.), copyright 2004, Springer-Verlag Berlin Heidelberg, pp. 113-124, 12 pages.

(56) References Cited

OTHER PUBLICATIONS

Tur, Gokhan et al., "Integrating Prosodic and Lexical Cues for Automatic Topic Segmentation," Computational Linguistics, vol. 27, No. 1, Mar. 2001, pp. 31-57, 27 pages.

PCT/IB/326: Notification Concerning Transmittal of International Preliminary Report on Patentability for corresponding international application PCT/US2011/053660 mailed Apr. 11, 2013.

* cited by examiner

METHOD, SYSTEM, AND COMPUTER READABLE MEDIUM FOR GRAPHICALLY DISPLAYING RELATED TEXT IN AN ELECTRONIC DOCUMENT

CROSS REFERENCE TO RELATED APPLICATIONS

This application claims the benefit of U.S. provisional patent application No. 61/387,718, filed Sep. 29, 2010, the content of which is hereby incorporated herein by reference in its entirety. Further, this application is related to co-pending U.S. utility patent application Ser. No. 13/239,360, filed simultaneously herewith and titled "METHOD, SYSTEM, AND COMPUTER READABLE MEDIUM FOR CREATING CLUSTERS OF TEXT IN AN ELECTRONIC DOCUMENT," and U.S. utility patent application Ser. No. 13/239,367, filed simultaneously herewith and titled "METHOD SYSTEM, AND COMPUTER READABLE MEDIUM FOR DETECTING RELATED SUBGROUPS OF TEXT IN AN ELECTRONIC DOCUMENT," all of which are hereby incorporated herein by reference in their entireties.

TECHNICAL FIELD

The present disclosure relates to systems and methods for navigating electronic texts.

BACKGROUND

Electronic books, or e-books, are text and image-based publications in digital form produced on, published by, and readable on computers or other electronic devices. E-books are often read on dedicated hardware devices, such as e-book readers or e-book devices. Personal computers, mobile devices, such as smart phones, and other suitable devices may also be used for reading e-books.

Often, while reading a long or complicated electronic text in an e-book, a user may lose track of previous plot elements or may forget about characters or objects. This problem may be worse for lengthy stories that span a series of novels, since plot elements and entities from previous entries in the series can frequently influence development in subsequent novels. For at least this reason, it is desired to provide systems and methods for aiding users when navigating electronic texts.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are systems and methods for navigating electronic texts. According to an aspect, a method may include receiving search criteria for searching an electronic text. Further, the method may include determining text subgroups within the electronic text. The method may also include determining, for each text subgroup, a similarity relationship between the search criteria and the text subgroup. Further, the method may include presenting, for each text subgroup, a graphic representing the similarity relationship between the text subgroup and the search criteria.

According to another aspect, a method may include determining text subgroups within an electronic text. The method may also include selecting a text seed within one of the text subgroups. Further, the method may include determining a similarity relationship (e.g., a semantic relationship) between the text seed and one or more adjacent text subgroups that do not include the selected text seed. The method may also include associating the text seed with the one or more adjacent text subgroups based on the similarity relationship to create a text cluster.

According to another aspect, a method may include determining text subgroups within an electronic text based on a similarity relationship (e.g., a semantic relationship) of content within each text subgroup. The method also includes determining, for each text subgroup, another similarity relationship between content of the text subgroup and one or more other text subgroups. Further, the method may include linking, for each text subgroup, the text subgroup to the one or more other text subgroups based on the other similarity relationship.

According to another aspect, a method may include determining that a user non-linearly navigates between text subgroups within electronic text. The method may also include linking the text subgroups in response to determining that the user non-linearly navigates between the text subgroups.

According to another aspect, a method may include determining a current user position within an electronic text. The method may also include determining a current text subgroup corresponding to the current user position. Further, the method may include displaying in a first display area, a portion of the electronic text corresponding to the current text subgroup. The method may also include displaying in a second display area, one or more related text subgroups positioned before the current text subgroup. Further, the method may include displaying in a third display area, one or more related text subgroups positioned after the current text subgroup.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the present disclosure is not limited to the specific methods and instrumentalities disclosed. In the drawings.

DETAILED DESCRIPTION

Figure 1A:
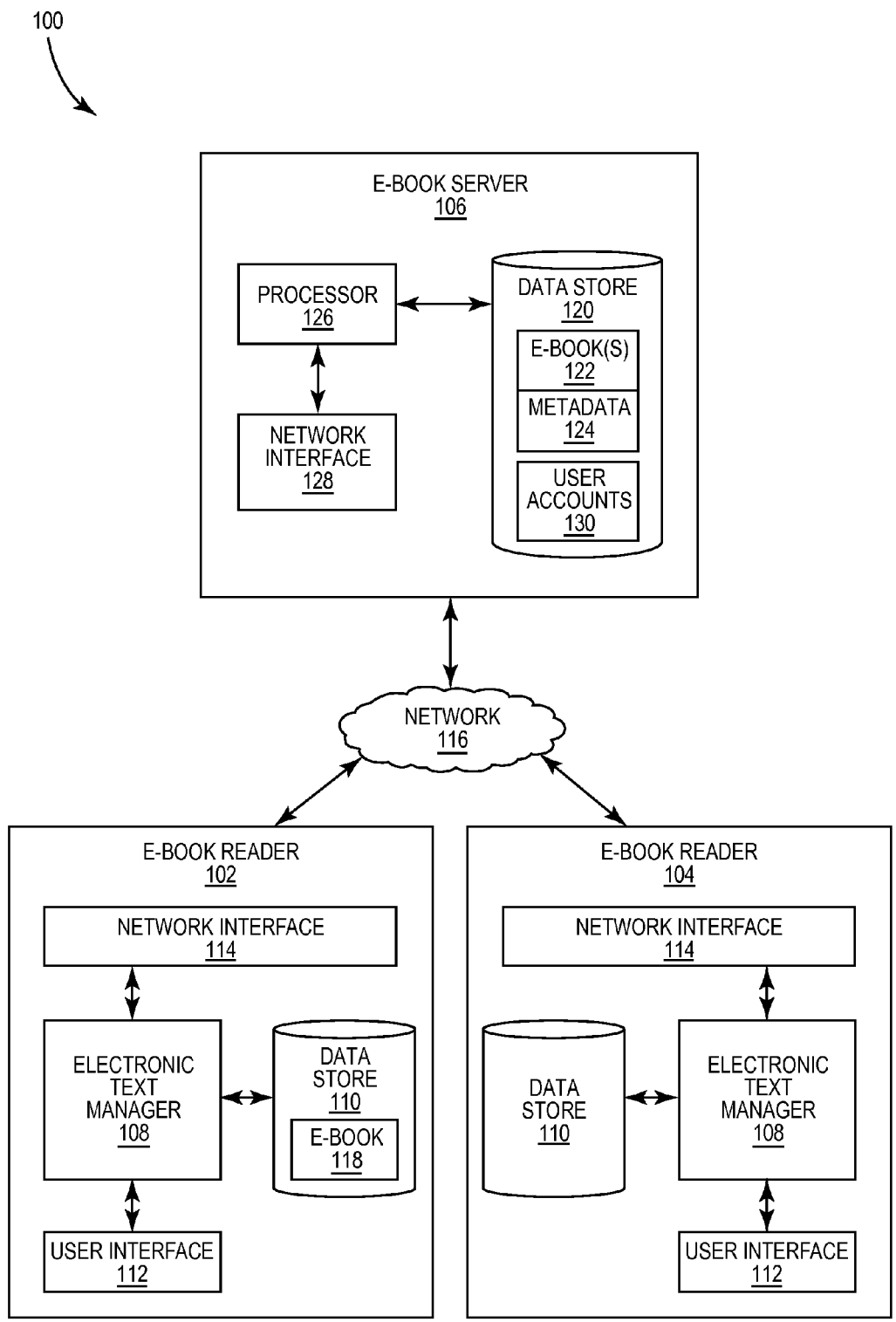
FIG. 1A is a schematic diagram of a system including e-book readers and an e-book server according to embodiments of the present disclosure.

The present disclosure is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Embodiments of the present disclosure enable an electronic device, such as an e-book reader, to determine text subgroups within an electronic text, to select a text seed within one of the text subgroups, to determine a similarity relationship (e.g., a semantic relationship) between the text seed and one or more adjacent text subgroups that do not include the identified text seed, to associate the text seed with the one or more adjacent text subgroups based on the similarity relationship to create a text cluster, and to link the text cluster to another one of the text subgroups within the electronic text based on a similarity relationship between the text cluster and the other one of the text subgroups. For example, text subgroups may include, but are not limited to, chapters, paragraphs, sentences, and the like. Further, for example, a text seed may include one or more words and the like. The text seed may be selected based on a relevance or similarity score assigned to words of the electronic text. The similarity relationship between the text seed and adjacent text subgroups may be determined by, for example, but not limited to, performing semantic analysis, performing natural language processing, using methods such as tokenization, sentence segmentation, parts-of-speech tagging, named entity recognition, stemming, lemmatization, co-reference resolution, parsing, relation extraction, vector space models, latent semantic analysis, and the like, identifying causal relationships between the text seed and the text subgroups, determining semantic similarity based on ontology, using a semantic index to compare semantic similarities, determining a statistic similarity, the like, and combinations thereof. Similar or related text subgroups may be combined to form text clusters of similar content. Subsequently, similar text clusters may then be linked together by, for example, navigation links. In this way and as described in further detail herein, portions of the electronic text that are semantically related may be linked together such that a user may select a portion of the electronic text and become directed to one or more semantically-relevant portions.

In other embodiments of the present disclosure, an electronic device is enabled to determine text subgroups within an electronic text based on a similarity relationship of the content within each text subgroup. Further, for each text segment, the electronic device may determine another similarity relationship between content of the text subgroup and one or more other text subgroups, and link the text subgroup to the one or more other text subgroups based on the other similarity relationship.

In other embodiments of the present disclosure, an electronic device is enabled to receive search criteria for searching an electronic text, and to determine text subgroups within electronic text. Further, for each text subgroup, the electronic device may determine a similarity relationship between the search criteria and the text subgroup, and present a graphic representing the similarity relationship between the text subgroup and the search criteria. For example, a user may select one or more passages and/or one or more keywords of electronic text for use in presenting a graphic representing a relationship between the passage(s) and/or keyword(s) and other portions of the electronic text, and for use in navigating directly to one or more other related portions of the electronic text.

In other embodiments of the present disclosure, an electronic device is enabled to determine that a user non-linearly navigates between text subgroups within an electronic text, and to link the text subgroups in response to determining that the user non-linearly navigates between the text subgroups.

In other embodiments of the present disclosure, an electronic device is enabled to determine a current user position within an electronic text, to determine a current text subgroup corresponding to the current user position, to display a portion of the electronic text corresponding to the current text subgroup in a first display area, to display one or more related text subgroups or navigation links to the related text subgroups in a second display area. In another embodiment, the related text subgroups may be divided into two subsets based on whether the related text groups are positioned before the current text subgroup or after, and the device is enabled to display one or more related text subgroups positioned before the current text subgroup in a second display area, and to display one or more related text subgroups positioned after the current text subgroup in a third display area.

As referred to herein, the term "electronic device" should be broadly construed. It can include any type of device capable of presenting electronic text to a user. For example, the electronic device may be an e-book reader configured to present an e-book to a user. Example e-book readers include, but are not limited to, the KINDLE® and NOOK® e-book readers. In another example, an electronic device may be a mobile device such as, for example, but not limited to, a smart phone, a cell phone, a pager, a personal digital assistant (PDA, e.g., with GPRS NIC), a mobile computer with a smart phone client, or the like. An electronic device can also include any type of conventional computer, for example, a desktop computer or a laptop computer. A typical mobile device is a wireless data access-enabled device (e.g., an iPHONE® smart phone, a BLACKBERRY® smart phone, a NEXUS ONE™ smart phone, an iPAD® device, or the like) that is capable of sending and receiving data in a wireless manner using protocols like the Internet Protocol, or IP, and the wireless application protocol, or WAP. This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or microbrowsers, which are web browsers with small file sizes that can accommodate the reduced memory constraints of wireless networks. In a representative embodiment, the mobile device is a cellular telephone or smart phone that operates over GPRS (General Packet Radio Services), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on an e-book reader, the examples may similarly be implemented on any suitable electronic device, such as a computer or smart phone.

As referred to herein, the term "electronic text" should be broadly construed. For example, an electronic text can reside on an electronic device. Example text can be presented and stored in the form of book pages that may be browsed using an electronic device. The text may be stored in any suitable format, such as, but not limited to, portable document format (PDF), hypertext markup language (HTML), extensible markup language (XML), EPUB, or any suitable e-book or word processing format.

As referred to herein, a "user interface" (UI) is generally a system by which users interact with an electronic device. An interface can include an input for allowing users to manipulate an electronic device, and can include an output for allowing the system to present information (e.g., e-book content) and/or data, indicate the effects of the user's manipulation, etc. An example of an interface on an electronic device includes a graphical user interface (GUI) that allows users to interact with programs in more ways than typing. A GUI typically can offer display objects, and visual indicators, as opposed to text-based interfaces, typed command labels or text navigation to represent information and actions available to a user. For example, an interface can be a display window or display object, which is selectable by a user of a mobile device for interaction. The display object can be displayed on a display screen of an electronic device and can be selected by and interacted with by a user using the interface. In an example, the display of the electronic device can be a touch screen, which can display the display icon. The user can depress the area of the display screen at which the display icon is displayed for selecting the display icon. In another example, the user can use any other suitable interface of a mobile device, such as a keypad, to select the display icon or display object. For example, the user can use a track ball or arrow keys for moving a cursor to highlight and select the display object.

Operating environments in which embodiments of the present disclosure may be implemented are also well-known. In a representative embodiment, a mobile electronic device, such as an e-book reader, is connectable (for example, via WAP) to a transmission functionality that varies depending on implementation. Thus, for example, where the operating environment is a wide area wireless network (e.g., a 2.5G network, a 3G network, or a 4G network), the transmission functionality comprises one or more components such as a mobile switching center (MSC) (an enhanced ISDN switch that is responsible for call handling of mobile subscribers), a visitor location register (VLR) (an intelligent database that stores on a temporary basis data required to handle calls set up or received by mobile devices registered with the VLR), a home location register (HLR) (an intelligent database responsible for management of each subscriber's records), one or more base stations (which provide radio coverage with a cell), a base station controller (BSC) (a switch that acts as a local concentrator of traffic and provides local switching to effect handover between base stations), and a packet control unit (PCU) (a device that separates data traffic coming from a mobile device). The HLR also controls certain services associated with incoming calls. Of course, embodiments in accordance with the present disclosure may be implemented in other and next-generation mobile networks and devices as well. The mobile device is the physical equipment used by the end user, typically a subscriber to the wireless network. Typically, a mobile device is a 2.5G-compliant device, 3G-compliant device, or 4G-compliant device that includes a subscriber identity module (SIM), which is a smart card that carries subscriber-specific information, mobile equipment (e.g., radio and associated signal processing devices), a user interface (or a man-machine interface (MMI)), and one or more interfaces to external devices (e.g., computers, PDAs, and the like). The electronic device may also include a memory or data store.

The presently disclosed subject matter is now described in more detail. For example, FIG. 1A illustrates a schematic diagram of a system 100 including e-book readers 102 and 104 and an e-book server 106 according to embodiments of the present disclosure. Referring to FIG. 1A, the e-book readers 102 and 104 may be any type of electronic devices capable of presenting an electronic text, such as an e-book, to a user. The e-book readers 102 and 104 comprise a number of functional components. This representation of the e-book readers 102 and 104 is meant to be for convenience of illustration and description, and it should not be taken to limit the scope of the present disclosure as one or more functions may be combined. Typically, these components are implemented in software (as a set of process-executable computer instructions, associated data structures, and the like). One or more of the functions may be combined or otherwise implemented in any suitable manner (e.g., in hardware, in firmware, in combined hardware and software, or the like). The e-book readers 102 and 104 may each include an electronic text manager 108 for managing storage of one or more electronic texts in respective data stores 110 and for controlling presentation of an electronic text to a user. The e-book readers 102 and 104 may each include a user interface 112 capable of receiving user input and of presenting an electronic text to a user. For example, the user interface 112 may include a display capable of displaying an e-book to a user. The data stores 110 may be a suitable memory device.

The e-book readers 102 and 104 may also be capable of communicating with each other, the e-book server 106, and other devices. For example, the e-book readers 102 and 104 may each include a network interface 114 capable of communicating with the e-book server 106 via a network 116, such as the Internet, such as a wireless network, local area network (LAN), or any other suitable network. In another example, the e-book readers 102 and 104 can be Internet-accessible and can interact with the e-book server 106 using Internet protocols such as HTTP, HTTPS, and the like.

The operation of the e-book reader 102 can be described by the following example. As shown in FIG. 1A, the e-book reader 102 includes various functional components and the data store 110 to facilitate the operation. The operation of the disclosed methods may be implemented using components other than as shown in FIG. 1A. In an alternative embodiment, this example operation may be suitably implemented by any other suitable electronic device, such as, but not limited to, a server or other electronic device having at least a processor and a memory.

Figure 2:
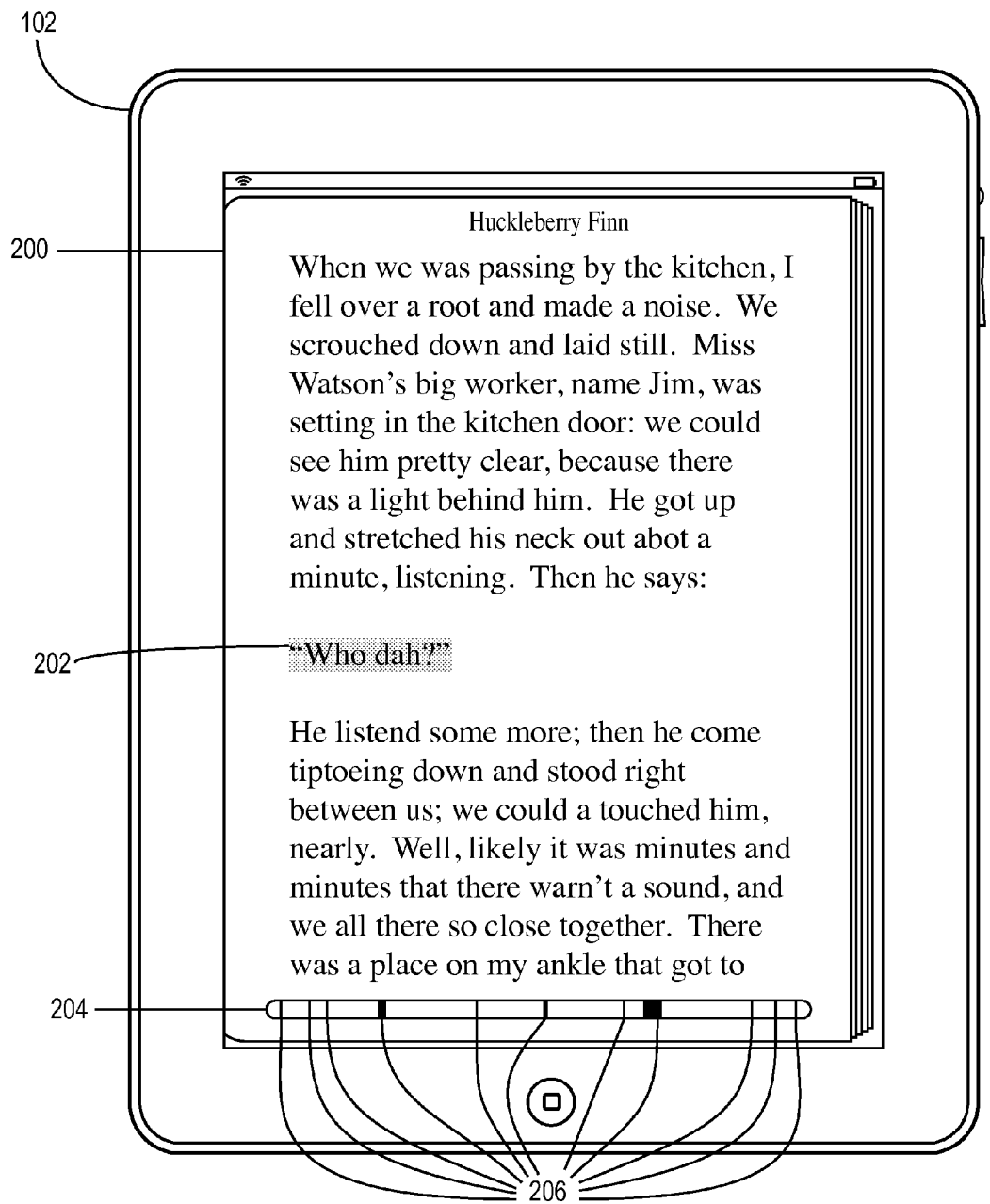
FIG. 2 is a front view of an e-book reader displaying content of an e-book via its display in accordance with embodiments of the present disclosure.

In an example, a user of the e-book reader 102 may use an application (often referred to as an "app") residing on the e-book reader 102 to interact with an e-book 118 stored in the data store 110. The application may reside on the e-book reader 102 and be a part of the electronic text manager 108. The user may, for example, input commands into the user interface 112 for opening the e-book 118 and for interacting with the e-book 118. The application may present text and/or images of the e-book 118 to the user via a display of the user interface 112. For example, FIG. 2 illustrates a front view of an e-book reader 102 displaying content of an e-book via its display 200 in accordance with embodiments of the present disclosure. In this example, the display 200 is a touch screen display. The user may suitably interact with the e-book reader 102 to control the display of different portions of the e-book's content. For example, the user may touch the display 200, such as by use of a "swiping" motion on the surface of the display 200, to command the electronic text manager 108 to "turn" pages of the e-book as will be understood. The user may turn or otherwise select pages for display by any other suitable technique as will be understood. As described in further detail herein, selection of a portion of the content of the e-book, such as by touching a portion of text displayed by the e-book, may be interpreted as input for semantic navigation to a related portion of the e-book in accordance with embodiments of the present disclosure.

In accordance with embodiments of the present disclosure, the user of the e-book reader 102 may interact with the display 200 to select one or more portions of displayed content of the e-book for initiating semantic navigation based on the selected portion(s). In an example, the user may interact with the display 200 for selecting a displayed phrase 202. Selection of the phrase 202 may be verified to the user by any suitable techniques such as by highlighting or bolding the letters or other characters in the phrase 202. The user may select a portion of the e-book by touching or swiping a desired portion of the e-book displayed to the user. For example, the user may touch or swipe a word, one or more paragraphs, or the entirety of a displayed page for selecting that portion of the display. The electronic text manager 108 may receive identification of the selected portion and, in response, navigate to a relevant position within the e-book as described in further detail herein.

Figure 3:
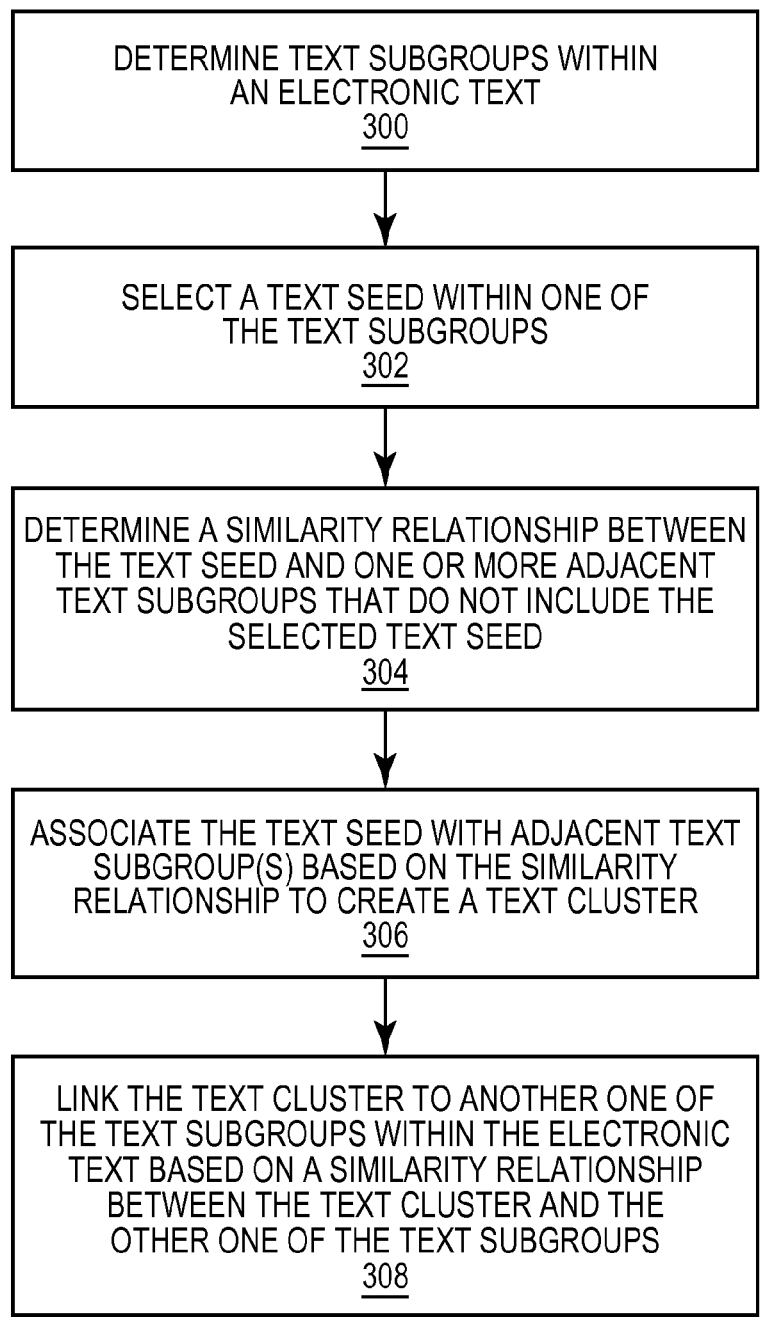
FIG. 3 is a flow chart of an exemplary method for providing a link for navigating an electronic text in accordance with embodiments of the present disclosure.

In accordance with embodiments of the present disclosure, FIG. 3 illustrates a flow chart of an exemplary method for providing a link for navigating an electronic text. The method of FIG. 3 is described with respect to the example e-book reader 102 shown in FIGS. 1 and 2, although the method may be implemented by any suitable system or electronic device. The steps of FIG. 3 may be implemented entirely, or in part, by the electronic text manager 108 residing on the e-book reader 102 shown in FIG. 1A. The electronic text manager 108 may be implemented by software, hardware, firmware, or combinations thereof.

Referring to FIG. 3, the method includes determining text subgroups within an electronic text (step 300). For example, the electronic text manager 108 may access the text and/or metadata of the e-book 118 and may identify text subgroups within the text based on the text and/or metadata. For example, the electronic text manager 108 may identify chapters, paragraphs, and sentences within the e-book 118. The electronic text manager 108 may suitably identify such text subgroups based on punctuation, headings, and other indicators contained in the text of the e-book 118 or by using natural language processing methods. In another example, an e-book may include metadata that identifies text subgroups, such as the beginning and ending of each chapter within the e-book.

The method of FIG. 3 includes selecting a text seed within one of the text subgroups (step 302). A text seed within a text subgroup may be selected based on its determined relevance. For example, the electronic text manager 108 may determine a relevance score for each word within the e-book 118. The electronic text manager 108 may determine the word frequency, or term frequency, for each word. For each word, the electronic text manager 108 may determine a word weighting by dividing the term frequency by the "inverse document frequency," which may be determined by counting the number of times a word occurs in multiple documents and the number of documents in which each word occurs. In one embodiment, instead of, or along with, the inverse document frequency, an "inverse segment frequency" may be used, which may be determined by counting the number of segments, such as chapters or paragraphs within the current document, in which a word occurs. Words corresponding to persons, places, or things occurring in the e-book may be given additional weighting. A relevance score for the word may be assigned based on the word weighting for the word. The electronic text manager 108 may choose the text seed based on the relevance score. In another embodiment, the text seed may also be selected based on its position within the text, or randomly, for instance if there are multiple text seeds with similar word weighting-based relevance scores. In this example, the selected text seed may be one of the words having one of the highest relevance scores.

The method of FIG. 3 includes determining a similarity relationship between the text seed and one or more adjacent text subgroups that do not include the selected text seed (step 304). This step may initiate a process herein referred to as "clustering" by which similar text subgroups are associated with one another to create a "text cluster." A text cluster may include a grouping of words, sentences, paragraphs, chapters, and the like that have been deemed relevant and that are positioned adjacent or near each other in the electronic text.

Multiple text seeds may be selected within the electronic text for creating multiple text clusters as described herein. In an example of using a text seed to create a text cluster, the electronic text manager 108 may determine a similarity score between a text seed and sentences (or other portions of the electronic text) immediately before and immediately after the text seed. If the text seed is separated from a sentence by, for example, a paragraph break or chapter break, the similarity score may be penalized or reduced by a predefined value. Such penalties may be applied across breaks, because it is likely that subject matter will change across paragraphs and chapters.

The method of FIG. 3 includes associating the text seed with the one or more adjacent text subgroups based on the similarity relationship to create a text cluster (step 306). For example, a text seed may be associated with the adjacent text subgroup having the highest similarity score to create a text cluster. The text cluster may then be compared to other portions of the electronic text immediately before and immediately after the text cluster. The electronic text manager 108 may determine a similarity score between the text cluster and sentences (or other portions of the electronic text) immediately before and immediately after the text cluster. If the text cluster is separated from a portion of the electronic text by, for example, a paragraph break or chapter break, the similarity score may be penalized or reduced by a predefined value. The similarity score may also be penalized if the size of the resulting text cluster is overly large, for instance, if it crosses a certain size threshold. The sentence having the highest similarity score may be added to the text cluster to form a modified text cluster. Multiple text clusters may be added to in this manner until all text subgroups in the electronic text have been added to a text cluster.

The method of FIG. 3 includes linking the text cluster to another one of the text subgroups within the electronic text based on a similarity relationship between the text cluster and the other one of the text subgroups (step 308). For example, the electronic text manager 108 may determine a similarity score between the text cluster and other text clusters within the electronic text. It is noted that clusters may contain one or more text subgroups. The electronic text manager 108 may determine a highest similarity score among the determined similarity scores. Subsequently, the electronic text manager 108 may link the text cluster to the text subgroup (or other text cluster) having the highest similarity score. When the electronic text is opened for presentation to a user, for example, a user interface of an e-book reader may present a navigational link that links the text cluster to the linked-to text subgroup. In this way, when a portion of the text cluster is presented to a user, the user may select the navigational link for navigating to the related, linked-to text subgroup.

In some embodiments, the text clusters generated by the clustering algorithm may overlap in part with text clusters before and after it. This differs from other methods of text segmentation in the art, wherein segments do not overlap as they are meant to each represent a sub-topic, subject or a discussion of a sub-topic in itself. However, the method of FIG. 3 described above that incrementally clusters text subgroups, such as sentences, into text clusters by comparison with a seed text may result in overlapping clusters. This may happen, for example when multiple relevant topics or subjects are discussed within a passage, and subsequent passages continue discourse on only a subset of the subjects of previous passages. Here, the overlap in adjacent clustered text clusters would include subjects or topics that are common to both text clusters. Note that, however, the overlap in text clusters may be purely for the purposes of organization and generation of navigation links, and may not reflect in the user interface, that is, it may not result in repeated display of text to users. In an embodiment, the seed-based clustering algorithm may be applied recursively on the text clusters it has generated, thereby further generating text sub-clusters within each text cluster. Each text sub-cluster may include one or more text subgroups within a text cluster. For example, each subset of subgroups within a text-cluster relating to a different subset of sub-topics in the larger text cluster may be clustered into a text sub-cluster. These recursively generated sub-clusters may have a hierarchical structure, and hence may be stored as hierarchical records and may enable hierarchical navigation or navigation based on varying levels of detail. For instance, when a user elects to navigate from a current text cluster, a top-level related text cluster may be found based on semantic and contextual matching with the current top-level text cluster, and a more specific related text sub-cluster or individual text subgroup may be found within the top-level text cluster by further semantic and contextual matching with the sub-cluster in the current top-level text cluster at which the user is positioned, or the specific text in the current text cluster selected by the user.

Figure 1B:
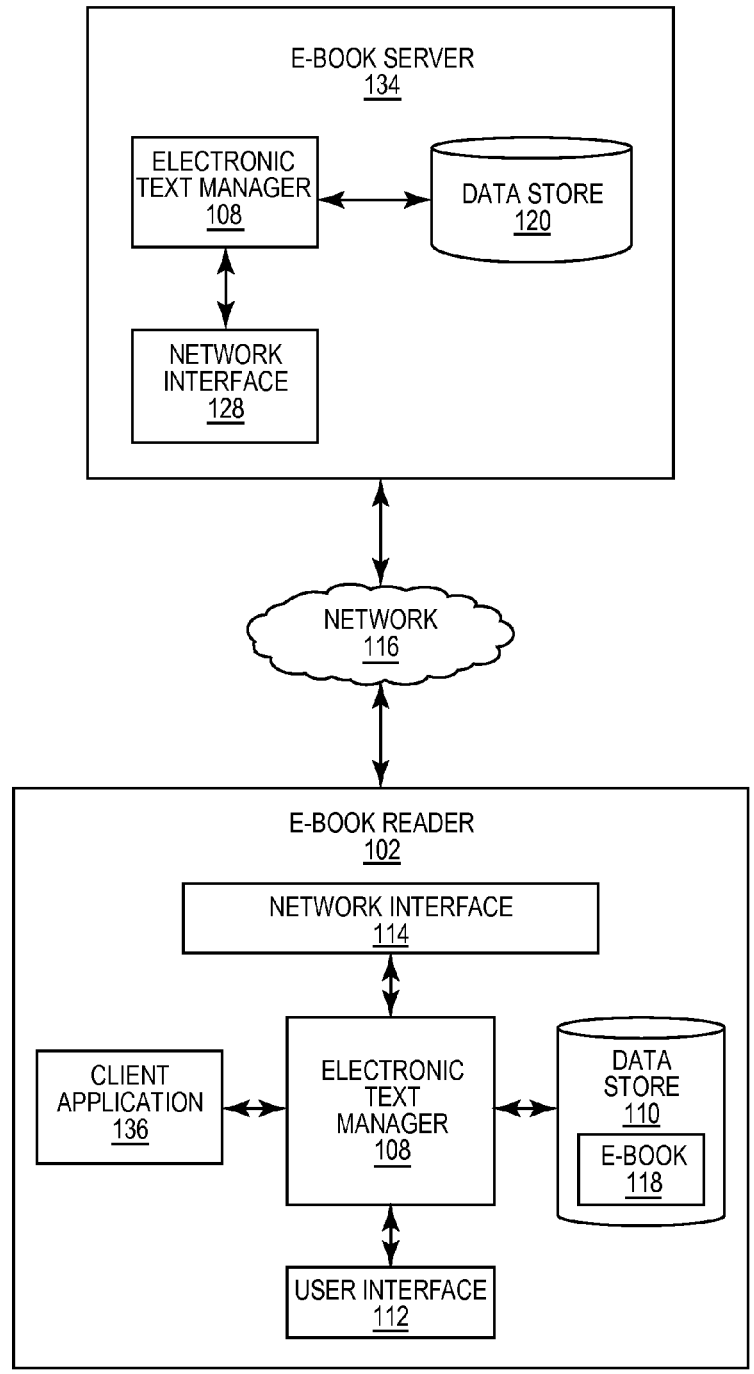
FIG. 1B is a schematic diagram of a system including an e-book reader and an e-book server according to embodiments of the present disclosure.

FIG. 1B illustrates a schematic diagram of a system 132 including an e-book reader 102 and an e-book server 134 according to embodiments of the present disclosure. Referring to FIG. 1B, the e-book server 134 may include an electronic text manager 108 configured to determine text subgroups within an electronic text, select a text seed within one of the text subgroups, determine a similarity relationship between the text seed and one or more adjacent text subgroups that do not include the selected text seed, and associate the text seed with the one or more adjacent text subgroups based on the similarity relationship to create a text cluster in accordance with embodiments of the present disclosure. Further, the electronic text manager 108 may also link the text cluster to another one of the text subgroups within the electronic text based on a similarity relationship between the text cluster and the other one of the text subgroups.

In an embodiment, the e-book reader 102 may include a client application 136 for facilitating interaction with the e-book server 134. The client application 136 may be implemented by software, hardware, firmware, or combinations thereof. A user of the e-book reader 102 may initiate the client application 136 for selection of the e-book 118 for navigation in accordance with embodiments of the present disclosure. In response to the selection, all or a portion of the e-book 118 may be communicated to the e-book server 134 for determining text subgroups within the e-book 118, selecting a text seed within one of the text subgroups, determining a similarity relationship between the text seed and one or more adjacent text subgroups that do not include the selected text seed, and associating the text seed with the one or more adjacent text subgroups based on the similarity relationship to create a text cluster. Further, the e-book server 134 may link the text cluster to another one of the text subgroups within the e-book 118 based on a similarity relationship between the text cluster and the other one of the text subgroups. Text subgroup information, similarity relationship, text cluster, and/or link information may be communicated by the e-book server 134 to the e-book reader 102. This information may be used by the electronic text manager 108 of the e-book reader 102 for assisting the user to navigate the text of the e-book 118 in accordance with embodiments of the present disclosure. For example, when the e-book 118 is opened for presentation to the user, the user interface 112 may present one or more navigational links that links a text cluster to the linked-to text subgroup. In accordance with embodiments of the present disclosure, the e-book server 134 may implement this functionality either alone or in combination with the e-book reader 102.

The e-book server 134 may also be configured to suitably implement embodiments of other methods, processes, or functions disclosed herein. For example, the e-book server 134, either alone or in combination with the e-book reader 102, may be configured to implement the example methods of FIGS. 4-7, 9, and 11.

Figure 4:
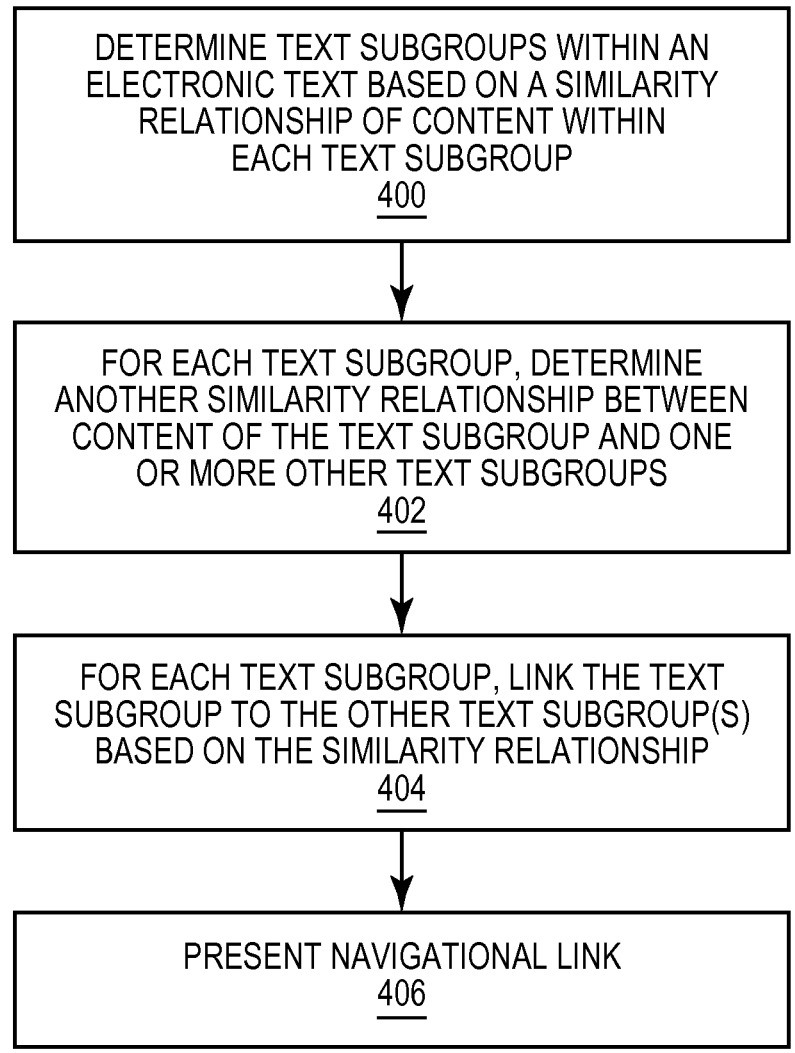
FIG. 4 is a flow chart of an exemplary method for linking text subgroups within an electronic text for use in navigating the electronic text in accordance with embodiments of the present disclosure.

In accordance with embodiments of the present disclosure, FIG. 4 illustrates a flow chart of an exemplary method for linking text subgroups within an electronic text for use in navigating the electronic text. The method of FIG. 4 is described with respect to the example e-book reader 102 shown in FIGS. 1 and 2, although the method may be implemented by any suitable system or electronic device. The steps of FIG. 4 may be implemented entirely, or in part, by the electronic text manager 108 residing on the e-book reader 102 shown in FIG. 1A. In another example, the steps of FIG. 4 may be implemented entirely, or in part, by the electronic text manager 108 residing on the e-book server 134 shown in FIG. 1B. The electronic text manager 108 may be implemented by software, hardware, firmware, or combinations thereof.

Referring to FIG. 4, the method includes determining text subgroups within an electronic text based on a similarity relationship of content within each text subgroup (step 400). For example, the electronic text manager 108 may select words, sentences, and/or paragraphs positioned in proximity to one another within the e-book 118 and that contain similar content to create a text cluster. Multiple text clusters may be defined with the e-book 118. Information for associating the selected words, sentences, and/or paragraphs as a text cluster may be stored in the data store 110. In one embodiment, subgroups may be created simply based on paragraph or chapter boundaries.

The method of FIG. 4 includes determining, for each text subgroup, another similarity relationship between content of the text subgroup and one or more other text subgroups (step 402). Continuing the aforementioned example of step 400, the electronic text manager 108 may determine a similarity score between the text cluster and other text clusters within the electronic text. It is noted that clusters may contain one or more text subgroups. The electronic text manager 108 may determine a highest similarity score among the determined similarity scores.

The method of FIG. 4 includes linking, for each text subgroup, the text subgroup to one or more other text subgroups based on the other similarity relationship (step 404). Continuing the aforementioned example of steps 400 and 402, the electronic text manager 108 may link the text cluster to the text subgroup (or other text cluster) having the highest similarity score. In another example, the electronic text manager 108 may determine a similarity relationship between a text subgroup and each other text subgroup positioned forward of the text subgroup within the e-book 118. In this example, the electronic text manager 108 may link the text subgroup to the forward-positioned text subgroup having the highest similarity relationship. In another example, the electronic text manager 108 may apply a similar technique to backward-positioned text subgroups for linking to the backward-positioned text subgroup having the highest similarity relationship. Further, for example, the electronic text manager 108 may store a navigational aid in the metadata of the electronic text that indicates association of the text subgroup to the linked-to text subgroup(s).

The method of FIG. 4 includes presenting a navigational link (step 406). For example, the electronic text manager 108 may control the user interface 112 to present a navigational link corresponding to a displayed text subgroup that may be selected by the user for navigating to another text subgroup linked to the displayed text subgroup.

The following is a detailed description of an embodiment of steps 400, 402 and 404 of FIG. 4. In this example, the text of the e-book 118 may be tokenized to generate tokens representing each word. Other suitable tokenization techniques may also be used to separate the text of e-book 118 into sentences or groups of sentences. It is noted that tokenization may be a part of, a result of, or a pre-requisite for separating the text content into subgroups (step 400). The following steps may then be performed on a text segment at a time or the text of the e-book 118 as a whole. It is noted that the term "segment" is used here to denote either a text subgroup or a text cluster.

Subsequently, natural language programming (NLP) techniques may be applied to the words in text segments, such as part-of-speech (POS) tagging to identify each word as a noun, verb, adjective, adverb, and so on; named entity recognition (NER) to identify which words are named entities, and whether they represent a person, place, thing, organization, and so on; parsing to generate semantic graphs and trees, such as dependency trees, from sentences; relationship extraction to identify relationships between words and entities, such as "is a", "has a", "in", and so on; and the like.

Based on the output of methods like POS-tagging and NER, a vocabulary is generated for the text of the e-book 118, which is a collection of the unique words that occur in the text. The same words with different POS tags (such as "desire" which may be a noun as well as a verb) may be treated as separate words in the vocabulary of the e-book 118. Words that occur in a predetermined list of "stop-words" (that is, words that may occur frequently but provide little semantic value) may be filtered from the vocabulary so as to maintain only the more semantically relevant words. Further, methods such as stemming and lemmatization may be used to detect multiple forms of the same words. Ontology (such as from an ontological database, for example, Wikipedia) may also be used to find interrelations between terms or related terms for a given word. A thesaurus database may be used to further disambiguate words or map various forms or synonyms of words to canonical versions. For example, only one of many words that mean the same thing may be chosen to represent all other meanings based on say, the form that is most commonly used, or the form that is alphabetically first or last, and so on. Concordances may also be used to identify related words and word senses given a current context (such as neighboring words) based on how often words appear next to each other, how often words occur within a certain distance of each other; how often words are syntactically linked, and so on. These example techniques may aid in reducing the size of the vocabulary to semantically unique and more relevant words, which may increase precision as well as reduce the processing resources required.

Other suitable advanced techniques may also be used, such as co-reference resolution, which can identify the nouns, proper nouns or named entities to which a pronoun may refer, and anaphora resolution, which are co-references to previously mentioned entities. These methods may be performed to more accurately identify word occurrences in text segments, and hence to generate a more accurate number of references to each term, which may result in more meaningful term frequencies and inverse document frequencies. The resulting number of term occurrences may be used instead of, or along with, the number of occurrences detected without co-reference resolution. In one embodiment, the weights assigned to resolved co-references may be lower than the weight assigned to the same term when referenced directly. This may be because co-reference resolution may produce erroneous results and thus skew the results. Furthermore, co-reference resolution may be an expensive method, and current methods using simpler metrics such as term frequency—inverse document frequency perform sufficiently well. Some other NLP methods used herein may even be designed to work without co-reference resolution, and hence their results may be affected by the use of co-reference resolution. However, in some embodiments, co-reference resolution may be used to further fine tune the results and avoid incorrectly linking less related segments.

The vocabulary may be used to generate an index of terms that also contains the list of positions in the text of the e-book 118 that each term occurs at, as well as the subgroups in which the term occurs. This index may be used to quickly look up the locations of and the subgroups containing each significant term.

Next, the term frequency—inverse document frequency (TF.IDF) scores are determined for each word in the vocabulary. In this embodiment, however, since the e-book 118 is the only document, the document frequency (DF) is actually represented by the text segment frequency, that is the number of text segments a term occurs in, instead of the number of documents. Thus, in one embodiment, a segment is used in place of a document as a unit of text, since all the relevant text may be contained within a single document (e-book 118), or a series of inter-related documents. Thus, the inverse document frequency is actually the inverse segment frequency (ISF). Note that in addition, an actual IDF score may also be used along with an ISF, based on DF extracted from a corpus of multiple documents by standard means known in the art.

In one embodiment, a vector space model (VSM) is used to determine relationships between segments. In a VSM, terms in a vocabulary are represented as weighted numbers in a vector, where the weights are determined based on term frequency, number of occurrences, TF.IDF, and so on. Term vectors may be generated for segments similar to how vectors are created for entire documents in the art. A term vector is created for each segment by creating a vector of scores representing each term with one element per term in the vocabulary. As mentioned before, less relevant terms may be filtered, using methods such as stop-words or by sorting and filtering the lowest weighted or least frequency words. For each term in the vocabulary for each segment, the count of occurrences of that term in the segment is assigned to the element in the vector corresponding to that term in the vocabulary.

Each element in the vector may further be weighted based on various criteria. Weights may be assigned to words in vocabulary based on their word type (POS tag, such as noun, verb, adverb), word frequency and frequency distribution, named entity type (person, place, organization) if the word is determined to be a named entity and the like. In one embodiment, named entities are weighted more heavily as they may be strong indicators of narrative context. For example, named entities that are persons may be assigned the highest weights, whereas named entities that are places may be weighted next highest, and so on. Elements in the vector may be weighted by multiplying the previously assigned value (such as TF.IDF) with the assigned weight.

In an embodiment, the concept of "start-words", as opposed to "stop-words", is introduced and applied. Start-words are a predetermined set of words that may be significant to the narrative or text, especially for different kinds of texts. Start-words may be weighted more heavily for texts to which they are more relevant. For instance, for suspense novels, start-words may include "kill," "stalk," "mystery," "murder," "discover," "investigate," "surprise," "shock," and so on, or various forms thereof. For action novels, start-words may include "shoot," "explosion," "fight," and the like. For technical texts, start-words may include technical terms specific to the field of technology to which the text is related. Note that specific start-words may be used to identify, characterize and categorize specific significant sections of the text, such as events, major plot developments, twists, other narrative structures, major results in a mathematical proof, and so on. Start-words may even be specific to authors, genres, and the like, or dynamically chosen based on readers' preferences. Start-words may be provided by human input, for instance by an author, publisher, editor, or reader. Start-words may also be automatically generated using methods such as term extraction, keyword detection, and so on, or a combination thereof. For example, start-words may be automatically generated from a single document, a corpus of related documents, a corpus of unrelated documents, or combinations thereof. A combination of manual and automated methods may be used for generating start-words.

Next, for each segment, related segments are found by correlating word scores (TF.IDF, word frequencies, weighted TF.IDF, and the like) in the term vectors for the respective segments. In one embodiment, the cosine distance metric is used. The cosine of each pair of vectors is determined to denote the semantic relatedness score, and the higher the cosine distance of vectors of two text segments, the more related the segments may be. Applying this to all pairs of vectors generates a square matrix of cosine distances, where the row and column of each element correspond to a respective text segment, and the element itself represents the semantic or similarity relationship between those respective text segments. As the cosine distance is commutative, this matrix is symmetric about the diagonal, and it is sufficient to only compute the cosine distance for each unique pair regardless of order. It is noted that other methods and metrics may also be used to determine semantic relatedness. Depending on whether the metrics used are commutative, the matrix may or may not be symmetric. In an embodiment, each term in each segment is textually compared with each term in every other segment to determine similarity or semantic relatedness. In another embodiment, each word in a segment may be indexed into a hash-table, and semantic relatedness between segments may be determined by comparing the overlap of indexes or hashes of terms in the hash-table.

In an embodiment, only segments or vectors of segments whose positions in the text of e-book 118 are at least a threshold distance from each other may be considered for determining relatedness to each other. This may be done to avoid unnecessarily comparing and linking adjacent segments that would have a much greater probability of having high similarity relationships simply by virtue of having a greater probability of containing discourse of the same sub-topics or sub-plots, and which may de-emphasize the similarity relationships to more distant yet relevant segments. Additionally, there may be limited value in generating semantic links to text segments that are adjacent or very close to each other, since the user may typically read those segments in the same session and hence may not require re-reading, or may be able to navigate to nearby sections much more quickly via direct navigation (page-flipping) than through semantic navigation.

In another embodiment, latent semantic analysis (LSA) may be used. A matrix of word scores between columns corresponding to segments and rows corresponding to terms may be generated. The dimensions of this matrix would hence be determined by the number of segments and number of terms in the vocabulary. Singular value decomposition (SVD) may then be performed on the matrix, and the resultant matrices may be used to determine the most relevant terms by reducing the dimensions to contain the numerically largest elements. SVD may be useful in filtering noisy terms and returning the most relevant terms and relationships in segments.

In another embodiment, more complex methods such as parsing, information extraction, relation extraction, natural language understanding, first order logic, discourse semantics, discourse representation, and so on may also be used. For example, the POS-tagged and NER-processed tokens may be "chunked" to separate them into sentences, and the sentences may be provided to a parser that may generate a tree or graph structure containing each word and its syntactic or semantic relation to the other words in the sentences. This tree structure may be traversed to identify things like attributes and properties of entities, and the like. Relation extraction may also be performed to identify relations between entities, for example, the sentence "John is an accountant in Philadelphia" may be processed to determine that "John," a person, and "accountant," a noun or occupation, have an "is a" relationship, whereas "John" and "Philadelphia," a place, have a "(located) in" relationship.

These relations may be further used to identify contexts in a segment and find related segments. For instance, if a relation is identified in a sentence from a text segment (such as, "John left Philadelphia in 1997"), related segments would include sentences where that same relationship has been referenced (such as, in an earlier sentence, "John moved to Philadelphia in 1990"). In addition, these relations may be used to identify latent or inferred references to entities associated with those relations wherever only one part of the relationship is mentioned. For the above example, in a text wherever the words "the accountant" are mentioned, the system may infer that it refers to the person "John." To make finding related segments more efficient, these relationships may be indexed and associated with the segments where the relationships are mentioned, so as to provide quick look-ups of the related segments.

Parse trees for subsequent or adjacent sentences may be implicitly linked into a graph with a chronological "followed by" relationship, or with an index in a sequence or chronological timeline of the occurrences depicted in the sentences. Temporal references in the sentences may affect the placement of the tree in the sequence/timeline (for example, a sentence including a date may position the events in that sentence in the timeline at that date, which may be different from the time of the context for the current sentence). Additional graph-based methods may be used to further identify strong semantic, similarity, causal or other relationships between non-adjacent segments (as an example, the LexRank method may be used for connecting significant sentences).

In another embodiment, a combination of vector space methods (such as VSM), SVD, statistical methods (such as term frequency-based) and advanced methods (such as parsing and relation extraction-based methods) may be used to determine related segments.

After the related segments have been determined, the set of related segments for each segment may be ranked and filtered to identify the most relevant related segments. The number of segments considered most relevant may be limited to maintain relevancy of suggested segments, and to avoid generating unnecessarily numerous related segments and navigation links to them, which may result in undue extra processing and crowding of the user interface with diminishing returns on relevance. Related segments may be ranked based on their relationship score as determined by the VSM, cosine distance or SVD methods.

Related segments that are directly adjacent to a current segment, or within a certain threshold of distance from the current segment (in terms of length of words, sentences, passages, pages, etc.) may be excluded on the premises that they are directly or easily viewable to the user already; the user may have recently read them and so may not require re-reading; and they are more easily accessible by direct navigation (page-flipping) than by semantic navigation. As mentioned above, this optimization may be used earlier in the process to reduce the number of vectors compared, thus reducing processing resources required. Further, some related segments may be ranked lower and filtered out or ranked higher based on the time the user last read that segment. For example, if a significant amount of time has passed since a user has read a related text segment, there is a higher probability that the user has forgotten about it, and hence may wish to re-read it, than a text segment that the user has read very recently.

In an embodiment, some related segments may be ranked based on historical navigation behavior of other users, or users with similar profile to the current user. For example, if there is a particular segment that many users often flip back to re-read from one or more subsequent segments, that particular segment is identified as a particularly highly related segment and ranked higher.

The limit on the number of related segments may be a fixed number, a fixed number in each direction (that is, before and after), a pre-determined or dynamically selected fraction of the results, a dynamic number based on the distribution of scores in a vector for a given segment and so on. In an embodiment, the related segments for a segment may be sorted based on the similarity relationship scores between them, and then all related segments following a sharp drop, say, greater than 10% difference, in the similarity relationship score between adjacent sorted related segments may be filtered out.

Next, the method may find the most relevant terms relating each pair of related segments. These terms may be useful in highlighting the words in each segment and the related segment that provide the semantic or similarity relationships between the two segments. This may be done using the scores for the corresponding term in the vector corresponding to each segment. An example approach includes piecewise multiplying the scores corresponding to each term in each segment term vector to generate an inter-segment term significance vector (ISTSV), which denotes the relevance of each term in the vocabulary for the two text segments. Any term that does not occur in one or either segment may have a zero or very low score, and hence its score in the ISTSV will also be zero or very low. Conversely, a term that is prominent or frequent in both segments will have a higher score in the ISTSV. Terms corresponding to the highest scores in the ISTSV are chosen as the words that are most relevant to the pair of related segments. The relevant terms may also be trimmed down, for example, using their ISTSV score, to keep only the most relevant ones. It is noted that the vocabulary may contain words that have been stemmed, lemmatized or otherwise processed, so the set of most relevant terms may need to be mapped to the original words appearing in the segments. The POS type (noun, verb, adjective and the like) and named entity type (name, place, thing and the like) of each word may also be determined and associated with relevant terms.

Next, a record associating the two text segments is created, which may be a data structure containing the relevancy score between the two segments, the most relevant terms relating both segments, their corresponding ISTSV scores, and the like. The records for the related segments may be associated with the record or data structure for each segment. Related segments may be indexed by each relevant term to improve look-up and fetching speed. The records may be stored in the data store 110 of the e-book reader device 102.

Finally, using the records for related segments, navigation links between each segment and the segments most related to it based on semantic or similarity relationships may be generated.

In another embodiment, a heuristic direct reference-based linking technique may be used to generate navigation links and to generate or rank additional related segments. For example, the electronic text manager 108 may look for direct references to specific chapters, sections or passages and insert navigation links to the references chapters, sections or passages. As an example, every mention of "chapter 2" in the text of e-book 118 may be implicitly made a navigation link to the beginning of chapter 2 in the e-book 118. Similarly, every mention of "section 5.1" in the text of e-book 118 may be implicitly made a navigation link to the beginning of section 5.1. The relevant chapter and sections may be identified by corresponding chapter or section headings in the text, for example, using metadata or markup information available along with the e-book 118. Furthermore, the electronic text manager 108 may use the contextual information in the text surrounding the direct chapter or section reference to more accurately specify the particular relevant location or segment within the chapter or section, and generate the navigation link point so as to directly point to that location. For example, when a sentence says "We saw in Chapter 5 how caterpillars become butterflies", the navigation link may point directly to the specific text subgroups in chapter 5 that talk about caterpillars becoming butterflies, or text subgroups that contain the terms "caterpillar", "become", "butterfly", or combinations and morphological forms thereof. It is noted that this may also apply to forward references, for example, to sentences like "We will see in Chapter 5 how caterpillars become butterflies." Similarly, for example, in textbooks or technical texts, the system may identify direct references to tables, figures, charts, equations or formulae, and insert navigation links to the corresponding tables, figures, etc., wherever they are mentioned.

Figure 5:
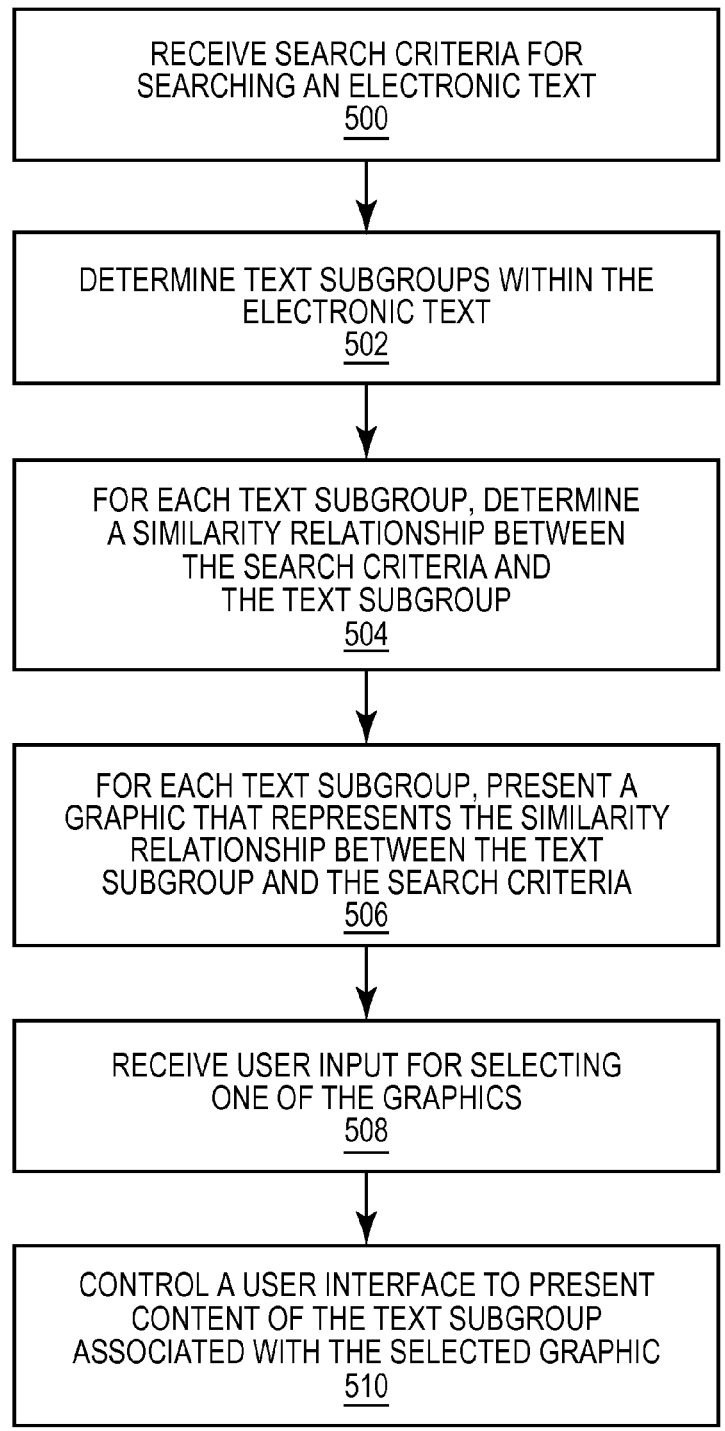
FIG. 5 illustrates a flow chart of an exemplary method for graphically representing similarity relationships between text subgroups within an electronic text in accordance with embodiments of the present disclosure.

In accordance with embodiments of the present disclosure, FIG. 5 illustrates a flow chart of an exemplary method for graphically representing similarity relationships between text subgroups within an electronic text. The method of FIG. 5 is described with respect to the example e-book reader 102 shown in FIGS. 1 and 2, although the method may be implemented by any suitable system or electronic device. The steps of FIG. 5 may be implemented entirely, or in part, by the electronic text manager 108 residing on the e-book reader 102 shown in FIG. 1A. The electronic text manager 108 may be implemented by software, hardware, firmware, or combinations thereof.

Referring to FIG. 5, the method includes receiving search criteria for searching an electronic text (step 500). For example, a user of the e-book reader 102 may interact with the user interface 112 for entering search criteria such as, but not limited to, identification of a person, place, thing, the like, or combinations thereof. For example, the user interface 112 may include a keyboard with which the user may enter the search criteria. As another example, the user may select words from the text of the e-book 118 displayed on the user interface 112 to be used as the search criteria, such as by highlighting with a mouse or by using touch gestures. The search criteria may be entered by the user for search of the e-book 118 for content related to the search criteria.

The method of FIG. 5 includes determining text subgroups within the electronic text (step 502). For example, the electronic text manager 108 may select words, sentences, and/or paragraphs positioned in proximity to one another within the e-book 118 and that contain similar content to create a text cluster. Multiple text clusters may be defined for the e-book 118. Information for associating the selected words, sentences, and/or paragraphs as a text cluster may be stored in the data store 110. In another example, text subgroups may be defined according to chapters, paragraphs, sentences, the like, and combinations thereof.

The method of FIG. 5 includes determining, for each text subgroup, a similarity relationship between the search criteria and the text subgroup (step 504). For example, the electronic text manager 108 may determine a similarity score between the search criteria and each of the text clusters of the e-book 118. The electronic text manager 108 may use the term vectors generated for each text cluster or subgroup to determine a similarity score, for example, by representing the search criteria terms as a term vector and using VSM methods to determine the most relevant subgroups as well as the similarity relationships to each subgroup. In an embodiment, the index constructed using the vocabulary may be used to quickly identify the subgroups and locations of the terms in the search criteria. It is noted that along with the search criteria, the electronic text manager 108 may also include terms from the text cluster or subgroup at the user's current reading position, such that the context may be used to further narrow what the user may be searching for.

The method of FIG. 5 includes presenting, for each text subgroup, a graphic that represents the similarity relationship between the text subgroup and the search criteria (step 506). For example, the electronic text manager 108 may control a display of the user interface 112 to display a graphic for indicating the similarity relationship between a text subgroup of the e-book 118 and user-entered search criteria. In an example, a portion of the display may represent the text subgroups. The text subgroups may be defined by several displayed icons or other indicia. The icons or other indicia may be colored differently to indicate a relevancy of the corresponding text subgroup to the search criteria. For example, the color red may indicate that the text subgroup is highly relevant to the search criteria, the color yellow may indicate that the text subgroup has a medium relevancy to the search criteria, and the color blue may indicate that the text subgroup has low level of relevancy to the search criteria.

In an example, the display 200 of the e-book reader 102 shown in FIG. 2 is controlled by the electronic text manager to display a graphic 204 representing a similarity relationship of text clusters of the e-book. In this example, the phrase 202 is selected and the graphic 204 indicates with colored portions 206, the text clusters relevant to the search criteria, i.e., the phrase 202. The graphic 204 may be a timeline or progress bar that is representative of one or more related portions of the electronic text and that highlights the related portion(s). The user may interact with the user interface of the e-book reader 102 to interact with the graphic 204 for navigating to one or more of the related portions.

The method of FIG. 5 includes receiving user input for selecting one of the graphics (step 508). For example, the colored portions 206 of the graphic 204 shown in FIG. 2 may be suitably selected by the user. The method of FIG. 5 includes controlling a user interface to present content of the text subgroup associated with the selected graphic (step 510). For example, the user may select one of the portions 206 shown in FIG. 2. In response to selection of the colored portion 206, the electronic text manager 108 may control the display of the user interface 112 to present content of the text cluster associated with the selected portion 206.

In accordance with embodiments of the present disclosure, an e-book reader or other electronic device may define text subgroups according to chapters and/or paragraphs of an electronic text. An electronic text manager, such as the electronic text manager 108 shown in FIG. 1A, may control a display of one or more graphics associated with the chapters and/or paragraphs. For example, one or more icons may be displayed that each represent a chapter or paragraph of an e-book. Subsequently, a user may suitably interact with one of the graphics to select the graphic(s). The electronic text manager may receive the user input for selecting the graphic. In response to receipt of the user input, the electronic text manager may present graphics representing relationships associated with user-entered search criteria. For example, in response to receiving user input selecting a graphic associated with a chapter of an e-book, the electronic text manager may control a display to present graphics representing relationships between user-entered search criteria and paragraphs within the chapter. In another example, in response to receiving user input selecting a graphic associated with a paragraph of an e-book, the electronic text manager may control a display to present graphics representing relationships between user-entered search criteria and sentences within the paragraph. Further, for example, the presented graphics may be an indicator of a similarity score between the search criteria and the corresponding portion (e.g., paragraph, sentence, and the like) of the electronic text.

In accordance with embodiments of the present disclosure, links may be generated based on user navigation behavior. The user navigation behavior may be collected from one or more users of an electronic text. The user navigation behavior may be used alone or together with other techniques disclosed herein for clustering or link generation. More particularly, user navigation behavior may be aggregated and analyzed to identify potentially relevant text subgroups or text clusters, and to generate links between them.

In an embodiment, user navigation behavior may refer to the way and/or order in which a user interacts with an electronic text, such as an e-book containing technical information. For example, user navigation behavior may be detected by tracking one or more of: a current position of a user within an electronic text (e.g., a page, chapter, passage, sentence, offset in a page, and the like of a user's position within an electronic text); time spent by a user at a position within an electronic text (e.g., the time spent at a position may be compared to the average time that a user spends at a similarly sized portion of the electronic text); a non-linear navigation of a user from a current position within an electronic text (e.g., "flipping" or "scrolling" between portions of an electronic text); determining or detecting which new portion of electronic text at which a user spends a predefined amount; and determining or detecting which portion(s) of electronic text that a user spends time at before returning to a current position within the electronic text. An electronic text manager, for example, may infer that navigation and/or time spent by the user between various portions in electronic text implies that there is a similarity or semantic relationship between those portions. The electronic text manager may use this information for identifying which portions should be clustered together by analyzing which contiguous portions the user spent time at. The electronic text manager may use this information to generate links between the portions or text subgroups. The links may be positioned in the order that the user navigated the portions.

Figure 6:
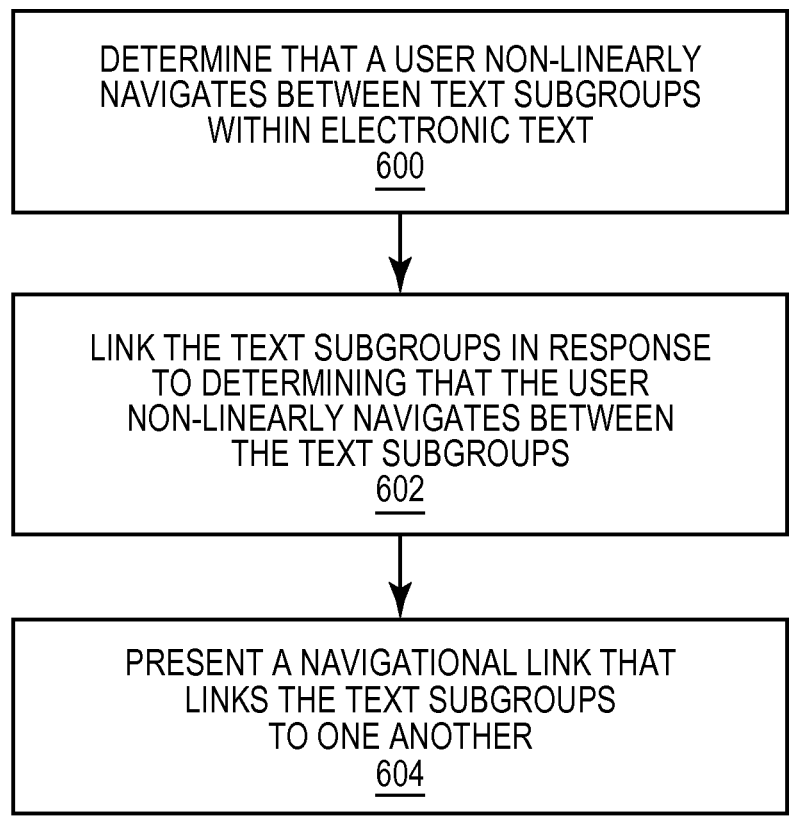
FIG. 6 illustrates a flow chart of an exemplary method of analyzing user navigation of an electronic text for linking text subgroups within the electronic text in accordance with embodiments of the present disclosure.

In accordance with embodiments of the present disclosure, FIG. 6 illustrates a flow chart of an exemplary method of analyzing user navigation of an electronic text for linking text subgroups within the electronic text. The method of FIG. 6 is described with respect to the example e-book reader 102 shown in FIGS. 1 and 2, although the method may be implemented by any suitable system or electronic device. The steps of FIG. 6 may be implemented entirely, or in part, by the electronic text manager 108 residing on the e-book reader 102 shown in FIG. 1A. The electronic text manager 108 may be implemented by software, hardware, firmware, or combinations thereof.

Referring to FIG. 6, the method includes determining that a user non-linearly navigates between text subgroups within electronic text (step 600). For example, the electronic text manager 108 of the e-book reader 102 shown in FIG. 1A monitors a user's input for interacting with the e-book 118. For example, the electronic text manager 108 may determine that the user has interacted with the e-book 118 by non-linearly moving between chapters or other portions (e.g., text subgroups) of the e-book 118. The electronic text manager 108 may also determine the time spent at the different portions. This information and other information described herein may be used by the electronic text manager 108 for determining that the user has non-linearly navigated between text subgroups of the e-book 118.

In an example, user navigation behavior information may be aggregated from multiple users and analyzed to detect navigation trends such as, but not limited to, non-linear navigation between text subgroups of an electronic text. The information may be used to determine which text subgroups that the users frequently, non-linearly navigate between. Based on this information, an electronic text manager may link the text subgroups in accordance with the present disclosure.

In another example, aggregation of collective user navigation behavior information may be performed by having multiple electronic devices, such as the e-book readers 102 and 104 shown in FIG. 1A, track the navigation behavior of their respective users. This information may be reported to the e-book server 106. For example, the e-book readers 102 and 104 may report respective navigation behavior information about a particular e-book to the e-book server 106 via the network 116. In this example, the e-book server 106 may analyze the collected information for determining links between text subgroups in accordance with the present disclosure. The e-book server 106 may subsequently report the link information to the e-book readers 102 and 104 for use in helping a user to navigate between text subgroups in accordance with the present disclosure. Further, for example, trend information across multiple electronic devices may be used to identify relevant clusters and generate links in accordance with the present disclosure. Further, this user behavior information may be used to weight and prioritize automatically-generated links. The link information may be provided individually to electronic devices as needed by users, or may be collectively downloaded by electronic devices as available.

The method of FIG. 6 includes linking the text subgroups in response to determining that the user non-linearly navigates between the text subgroups (step 602). For example, the electronic text manager 108 may link the text subgroups together. Further, for example, the electronic text manager 108 may store a navigational aid in metadata of the electronic text that indicates association of the text subgroups.

The method of FIG. 6 includes presenting a navigational link that links the text subgroups to one another (step 604). For example, the electronic text manager 108 may control the user interface 112 to present a navigational link corresponding to a displayed text subgroup that may be selected by the user for navigating to another text subgroup linked to the displayed text subgroup.

Figure 7:
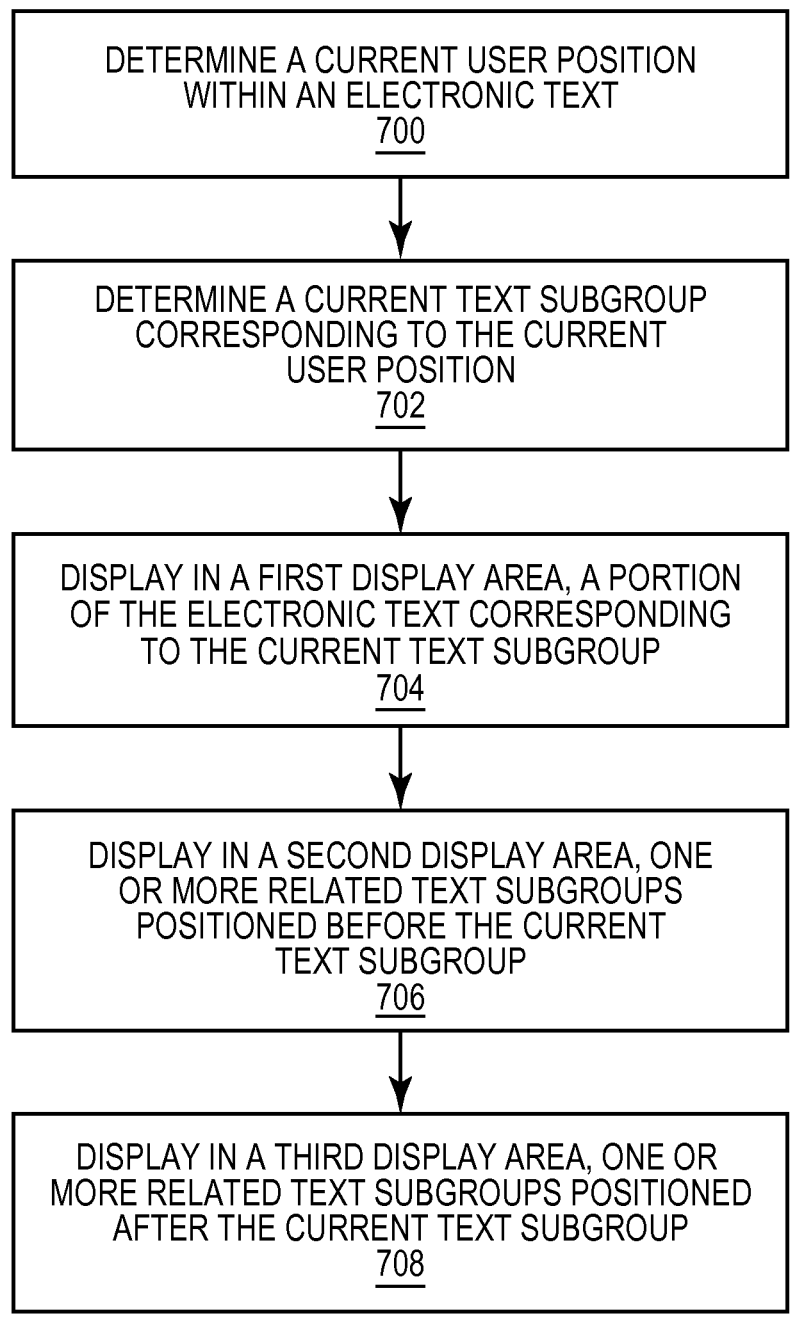
FIG. 7 illustrates a flow chart of an exemplary method of controlling a user interface to display text subgroups that are related to a current position of a user within an electronic text in accordance with embodiments of the present disclosure.

In accordance with embodiments of the present disclosure, a user interface of an electronic device may be controlled to display text subgroups related to a current position of a user within an electronic text. For example, FIG. 7 illustrates a flow chart of an exemplary method of controlling a user interface to display text subgroups that are related to a current position of a user within an electronic text. The method of FIG. 7 is described with respect to the example e-book reader 102 shown in FIGS. 1 and 2, although the method may be implemented by any suitable system or electronic device. The steps of FIG. 7 may be implemented entirely, or in part, by the electronic text manager 108 residing on the e-book reader 102 shown in FIG. 1A. The electronic text manager 108 may be implemented by software, hardware, firmware, or combinations thereof.

Figure 8:
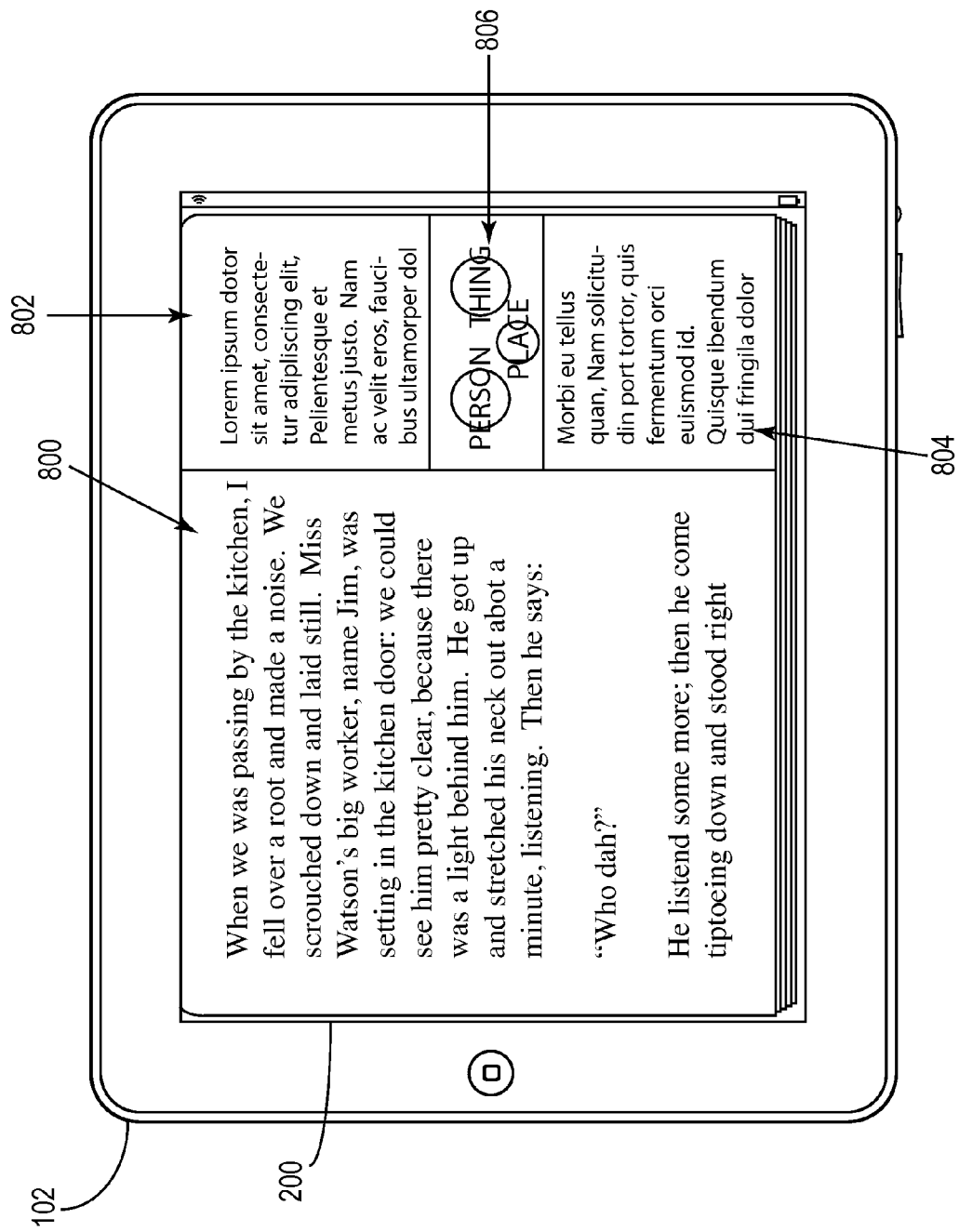
FIG. 8 illustrates a front view of an e-book reader displaying a portion of an electronic text within a display area in accordance with embodiments of the present disclosure.

Referring to FIG. 7, the method includes determining a current user position within an electronic text (step 700). For example, the electronic text manager 108 of the e-book reader 102 shown in FIG. 1A may determine a page number, chapter number, passage identifier, sentence identifier, offset in a page, and the like of a user's position within an electronic text. The current user position may correspond to the page, chapter, and the like that is currently being displayed to the user. For example, FIG. 8 illustrates a front view of an e-book reader 102 displaying a portion of an electronic text within a display area 800. The text within the display area 800 shown in FIG. 8 corresponds to the current user position within the electronic text.

The method of FIG. 7 includes determining a current text subgroup corresponding to the current user position (step 702). Continuing the example of step 700, the electronic text manager 108 shown in FIG. 1A may determine a current text subgroup corresponding to the current user position within the electronic text. For example, the currently-displayed text within the display area 800 shown in FIG. 8 may correspond to a text subgroup defined in accordance with the present disclosure. The currently-displayed text may include the entirety or a portion of the content of the text subgroup. The electronic text manager 108 may determine that the currently-displayed text within the display area 800 corresponds to a previously-defined text subgroup, which may be referred to as a current text subgroup since all or a portion of it is currently being displayed.

The method of FIG. 7 includes displaying in a first display area, a portion of the electronic text corresponding to the current text subgroup (step 704). For example, the electronic text manager 108 may control the display 200 shown in FIG. 8 to display in the display area 800, the text corresponding to the current text subgroup.

The method of FIG. 7 includes displaying in a second display area, one or more related text subgroups positioned before the current text subgroup (step 706). Continuing the aforementioned examples, the electronic text manager 108 may control the display 200 shown in FIG. 8 to display in a display area 802, content of one or more text subgroups positioned before the current text subgroup. Within the display area 802, the display 800 may display text of a text subgroup that is positioned before the current text subgroup and that has a similarity relationship to the current text subgroup in accordance with the present disclosure. The text displayed within the display area 802 may include the entirety or a portion of the content of the corresponding text subgroup.

The method of FIG. 7 includes displaying in a third display area, one or more related text subgroups positioned after the current text subgroup (step 708). Continuing the aforementioned examples, the electronic text manager 108 may control the display 200 shown in FIG. 8 to display in a display area 804, content of one or more text subgroups positioned after the current text subgroup. Within the display area 804, the display 800 may display text of a text subgroup that is positioned after the current text subgroup and that has a similarity relationship to the current text subgroup in accordance with the present disclosure. The text displayed within the display area 804 may include the entirety or a portion of the content of the corresponding text subgroup. It is noted that step 708, along with the display area 804 and the text contained therein, may be optional. For example, when reading a novel, the user may not wish to be shown forthcoming text that he or she has not yet read, as that may give away plot elements and negatively affect the reading experience. However, the display area 804 may be displayed if the corresponding text subgroup positioned after the currently displayed text subgroup has already been read by the user, for instance, when the user has temporarily navigated to a text subgroup positioned behind the current text subgroup.

In an embodiment, the electronic text manager 108 may sort the related text subgroups displayed in the display areas 802 and 804 by a similarity score between each corresponding text subgroup and the current text subgroup. For example, the electronic text manager 108 may determine a similarity score between the current text subgroup and each text subgroup positioned before and/or after the current text subgroup. The electronic text manager 108 may sort or rank the text subgroups based on the similarity score. For example, the text subgroups positioned before the current text subgroup may be sorted from highest to lowest similarity score. Further, for example, the text subgroups positioned after the current text subgroup may be sorted from highest to lowest similarity score. In an example, all or a portion of the content of one or more text subgroups having the highest similarity score may be displayed in the display area 802 or 804. Further, for example, for each displayed text subgroup, the electronic text manager 108 may control the display 800 to display a graphic as an indicator of similarity in an area adjacent to the display area for each corresponding text subgroup. In an example, the graphic may be a value of the similarity score or a color as disclosed herein for indicating the similarity. Text subgroups may be ranked or sorted based on a number of metrics including, but not limited to, a level of semantic relation, occurrence of similar keywords, presence of similar entities, the like, and combinations thereof. Display area 806 may be selectable by suitable user input, and useable for manipulating, controlling, and/or refining user navigation options.

In an embodiment, the electronic text manager 108 may display a navigation link to the corresponding text subgroup instead of a portion or all of the content of that subgroup in display areas 802 and 804. In another embodiment, the display areas 802 and 804 may be displayed along with the corresponding text, but additionally, in part or whole, may act as a navigation link themselves. The user may interact with the display areas 802 and 804 through, for example, a touch-screen display 200, to navigate directly to the position of the corresponding text subgroup in the e-book 118. The display area 802 may also display other information about the related text subgroups, such as graphical indications or numeric representations of the relevancy score, the most relevant terms common to the current text subgroup in display area 800 and the related subgroup, the inter-segment term significance vector scores of the common relevant terms, the relative or absolute location of the related text subgroup, and so on.

In an embodiment, a display area 806 may be displayed on the display 200. This area may provide controls with which a user may refine or manipulate the selection of and navigation to the related subgroups. For instance, as shown in FIG. 8, the display area 806 may include user interface (UI) controls to allow the user to manipulate the selection of related segments by adjusting the significance assigned to various word types in selecting related subgroups. In this example, the controls are displayed as a "tag cloud," allowing the user to adjust significance for persons, places and things. Hence if a user seeks related subgroups based on the characters referenced in the current text subgroup, he may assign more significance to the "person" tag. Adjusting the tag clouds may adjust different weights to the common relevant terms associated with the record of each pair of subgroups and the related subgroups, which may also be associated with their POS word types as well as named entity types. These adjusted weights may then be used to determine updated semantic relationship scores between the subgroups, and adjust the ranking, filtering and selection of presented related subgroups.

It is noted that to reduce processing resources required, such as CPU and memory, only a subset of the text subgroups nearest to the current text subgroup and their corresponding related subgroup records may be accessed and loaded in memory, either in advance or on-demand.

The displayed portion of texts in display area 800 may be enabled with possible navigation-related actions, such as by embedding actionable hyperlinks in relevant common terms, or presenting UI elements such as buttons, or associating touch gestures on the displayed portion of a text portion with navigation-related actions (for touchscreen devices). These elements may be invisible or non-highlighted until a user performs an action on the displayed text segment, for example by performing a mouse-over it, or touching it. When such a user action is received, the electronic text manager 108 may then present the navigation options available for the text subgroup corresponding to the text segment. In an embodiment, the electronic text manager 108 may highlight the current subgroup contained within the display area 800, for instance by changing the color of the text, or the background color of the text segment, to indicate to the user the current text segment with respect to which corresponding related segments may be found. This may serve to provide the user visual feedback as to what the electronic text manager 108 considers the current reading context. In an embodiment, a user may be able to manipulate the boundaries of the selected text subgroup by contracting or expanding it, which may also affect the scope of related subgroups. The user may also be able to select additional sections of, or whole other, adjacent subgroups to expand the scope of related subgroups. In this case, the number of candidate related segments is automatically greater. Hence, the most relevant of these may be selected either on-demand or in advance, by treating the user-selected segment as a single text subgroup and finding related subgroups using the methods above.

The electronic text manager 108 may then determine the available navigation options. As described previously, the electronic text manager 108 retrieves, ranks and filters the related subgroups based on the subgroup of text the user is currently located at, or has currently performed an action (such as a mouse, keyboard, gesture event, and the like) on. If the user specifically has selected or highlighted some words in the current text subgroup, the electronic text manager 108 uses those to dynamically filter and rank the related segments.

Related segments may be indexed by each relevant term to improve look-up and fetching speed. Alternately, the electronic text manager 108 may also attempt to guess what the user wants and present (or automatically execute) only the most probable action, for instance, based on actions by other users previously on the same segment of the text, or similar segments of texts.

In an embodiment, the electronic text manager 108 may only display navigation options links to related segments that occur before the current segment. This is because users typically may want to re-read only previously read sections, and because reading ahead may negatively affect the reading experience, for example, via spoilers. Thus, even if links to subsequent subgroups are available, it may be preferable to not present them because with accidental navigation the user may get ahead of himself and potentially spoil the reading experience. In an embodiment, forward navigation options may not be initially presented, but may be presented if the user explicitly requests them, for example by right-clicking on some link, or using another gesture, and the like. Forward navigation options may also be automatically presented if the navigation is to segments the current user has already read at least once. If the user is not the same, or there is doubt about user identity, forward navigation options may be preferably hidden.

The electronic text manager 108 may then present the available navigation options. The electronic text manager 108 may arrange links in a separate navigation area, such as 802 and 804, based on the score/rank and distance from the current text subgroup. It is noted that this constitutes an "in-place" display model, where the related subgroup options may be presented in a fixed portion of the display, and the navigation may be contained within only that portion of the display, such that the current text subgroup is always visible to the user. For example, in FIG. 8, all navigation may be contained to the portions 802 or 804 or both. In another embodiment, as mentioned above, the related segment content may be displayed as an overlay or pop-over, preferable placed unobtrusively. However, in an alternate embodiment, the electronic text manager 108 may provide a navigation-based model, where the user actually navigates to the location of the related subgroup in the document. The following three methods may be used in conjunction with either an in-place display model or a navigation-based model.

In an embodiment, the navigation options may be presented as discrete UI elements, such as hyperlinks or buttons with descriptive text identifying the related subgroups and corresponding metadata, including information such as corresponding page number, relevant keywords, semantic relationship scores, and the like.

In another embodiment, the links may be embedded within the text of the current subgroup, for example, by converting one or more relevant common terms in the text into actionable hyperlinks. The hyperlinked words may either point to the start of the most relevant segment; point directly to an occurrence of the relevant words in the text of the most relevant segment; or on being clicked in, may display a list of related segments, potentially filtered and ranked by the word that has been clicked.

In yet another embodiment, the options to navigate to related subgroups may be presented along with the corresponding text in separate display areas, such as 802 and 804 in FIG. 8. The text from the corresponding candidate related subgroups may be contracted or shortened when being presented in order to conserve display space, especially if there are several candidate subgroups. In one embodiment, the text content of the related subgroup may be contracted simply by truncating it after a fixed word or character length, preferably at a word boundary, and appending ellipsis (" . . . "). In another embodiment, advanced methods such as summarization may be used to generate a summary for related subgroups. Query-biased summarization methods may be used by using the relevant terms common to the current and related subgroups, and/or user-selected text, as the query terms to bias the summarization with, such that the most relevant sentences are displayed. The text, if contracted, may be expanded if the user so requests, such as by clicking or gesturing on it. The electronic text manager 108 may highlight relevant terms common to the current and/or related subgroups to visually indicate to the user the words that provide the basis of the semantic relationship between the two text segments.

Along with links to related segments, the system may also present a current relevancy score; a list of most relevant or common terms; a graphical or other indication of the relative or absolute locations of the related segments; and the like.

The electronic text manager 108 may then detect user actions on the presented navigation options. The electronic text manager 108 may detect actions specific to the UI method, for instance, navigation gestures on touchscreen devices or mouse events on browsers. On receiving a user action on a link, the electronic text manager 108 may then control the UI 200 to navigate to the selected related subgroup. As described previously, using a link may navigate either to the start of the related segment; or the most relevant part of the related segment, that is, the section where most of the relevant words occur. Alternately, instead of navigating to the related subgroup, a portion of the display area such as 802 may be updated to display the text of the related subgroup. On navigation to a related segment, the electronic text manager 108 may highlight the exact related subgroup, such as by changing color of text or background color of the section and so on, to precisely identify to the user where the most relevant related text may be. The display may be presented such that the related subgroup is centered on the display screen, or alternately at the top, to instantly capture the user's attention. The electronic text manager 108 may highlight the relevant common terms in the related subgroup only after the user navigates to it.

As a user navigates through the related segments, the electronic text manager 108 may maintain a linked list of subgroups the user has navigated through as a sequence of "breadcrumbs." The breadcrumbs sequence helps the electronic text manager 108 accept user navigation commands and navigate correctly by traversing back and forth along the list. It is noted that the breadcrumbs list may be a graph, specifically a tree, for complex navigation sequences that traverse the same related segment multiple times. It is noted that breadcrumbs may be a purely internal management data structure, as well as a UI element depicting the user's navigation history, such as seen on many Internet websites.

The electronic text manager 108 may also provide a quick "jump back" navigation option, which may be an easily accessible link, button or gesture to navigate back to the previous segment in the trail of breadcrumbs, or directly to the start of the breadcrumb trail, that is, the current text subgroup where the user ceased linear progress and started navigating non-linearly. When the user jumps back or otherwise resumes linear progress, the breadcrumb records may be deleted from memory. However, before deletion, the navigation details in the breadcrumbs may be uploaded to the server 106 as an instance of non-linear navigation for analysis and aggregation, as described in more detail subsequently.

In accordance with embodiments of the present disclosure, semantic navigation of an electronic text may be enabled by traversing a semantic graph or cause/effect graph of relations between entities such as, but not limited to, characters, places, objects, various plot elements, and the like. A semantic graph may be generated statically (e.g., by human input) or dynamically (e.g., by semantic or statistical analysis). A semantic graph may be generated, for example, manually such as by human input in the form of annotations, markup, and the like provided by an author, editor, or editorial staff. In another example, a semantic graph may be generated collaboratively such as by a community of readers. In another example, a semantic graph may be generated automatically by a suitable technique such as, but not limited to, semantic analysis; natural language processing; techniques such as tokenizing, part-of-speech tagging, named entity recognition, stemming, lemmatization, parsing, relation extraction, latent semantic analysis, vector space models, and singular value decomposition; identification of causal relationships between portions of an electronic text (e.g., a text seed and a text subgroup); semantic similarity based on ontology; a semantic index for comparing semantic similarities; and a statistic similarity; and passive observation of users reading an electronic text (e.g., noticing when a user uncharacteristically flips back from a certain position, and noting from where and to where he or she flips). A semantic relation between text subgroups may be determined based on these examples and others disclosed herein.

In an embodiment, navigation links may operate to enable "in-place" display of the related content. The user may click, touch, or otherwise select an available navigation link, and instead of the UI changing the user's position in the text to that of the related text subgroup that the navigation link points to, the UI may display the related content, for example, in a pop-up or an overlay, or in a second area of the display as shown in FIG. 8. Particularly, if the related subgroup contains figures or diagrams, the navigation may involve simply displaying the relevant figure or diagram along with the currently displayed text subgroup, for instance, as a non-intrusive pop-up or overlay. This way, when a text subgroup discusses a specific figure, the reader may not have to navigate back and forth from the figure while reading the associated text. This behavior may switch dynamically based on the distance of the figure from the corresponding text, for example, if the figure is on the same page or within a threshold distance, this method may not be used. As an example, in many patent documents the figures are near the beginning of the document, but the relevant descriptive text may be very far into the body of the document. Navigating back and forth may become annoying quickly, especially if the figure has many different elements in complex configurations that require constant flipping between the text describing those elements and the diagram. In an embodiment, the electronic text manager 108 may identify the referenced figure and overlay it at a non-obtrusive position, and may focus or zoom in on an element the user has selected or is currently reading about. Alternatively, the electronic text manager 108 may navigate to the figure and focus or zoom in on an element the user has selected or is currently reading about. Note that the same may be applied to text segments.

In accordance with embodiments of the present disclosure, metadata of an electronic text or other data associated with an electronic text may include various information defining text subgroups, text clusters, and/or navigation links as disclosed herein. This information may be defined or generated collaboratively by readers of the electronic text, authors of the electronic text, editors of the electronic text, and/or others. The information may be generated and shared among these users. For example, referring to FIG. 1A, e-book readers 102 and 104 may communicate with the e-book server 106 via the network 116 for retrieving e-books along with such information. In addition, e-book readers 102 and 104 may generate such information in accordance with the present disclosure and communicate the information to the e-book server 106 via the network 116. This information may be stored by the e-book server 106 in a data store 120, which may store one or more different e-books 122 and associated metadata 124.

The e-book server 106 may include a processor 126 configured to implement the functions disclosed herein. For example, the processor 126 may be configured for collecting information defining text subgroups, text clusters, and/or navigation links as disclosed herein. Further, the e-book server 126 may include a network interface 128 configured to communicate with the network 116 or another communications network for exchanging information and data with the e-book readers 102 and 104, servers, or any other electronic devices.

The data store 120 of the e-book server 106 may store user account information 130 including information about the users of e-book readers 102 and 104 and other electronic devices. In an example, a user of the e-book reader 102 may register for an account with the e-book server 106. The user may enter his or her information by interaction with the user interface 112, and the e-book reader 102 may communicate this information to the e-book server 106 via the network interface 114. The information may be stored in the user accounts 130. Further, for example, the user may interact with the user interface 112 to request the download of an e-book from the e-book server 106 via the network 116. The e-book may be downloaded to the e-book reader 102 via the network 116 upon completion of a purchase transaction. In addition to the e-book, the e-book reader 102 may receive metadata associated with the e-book. An unregistered user may receive default metadata for the e-book. A registered user may make changes to the metadata that are persisted across viewing sessions, and may contribute edits to the metadata stored in the e-book server 106. The e-book server 106 may receive from e-book readers information for use in determining text subgroups, text clusters, and/or navigation links in accordance with the embodiments disclosed herein.

Figure 9:
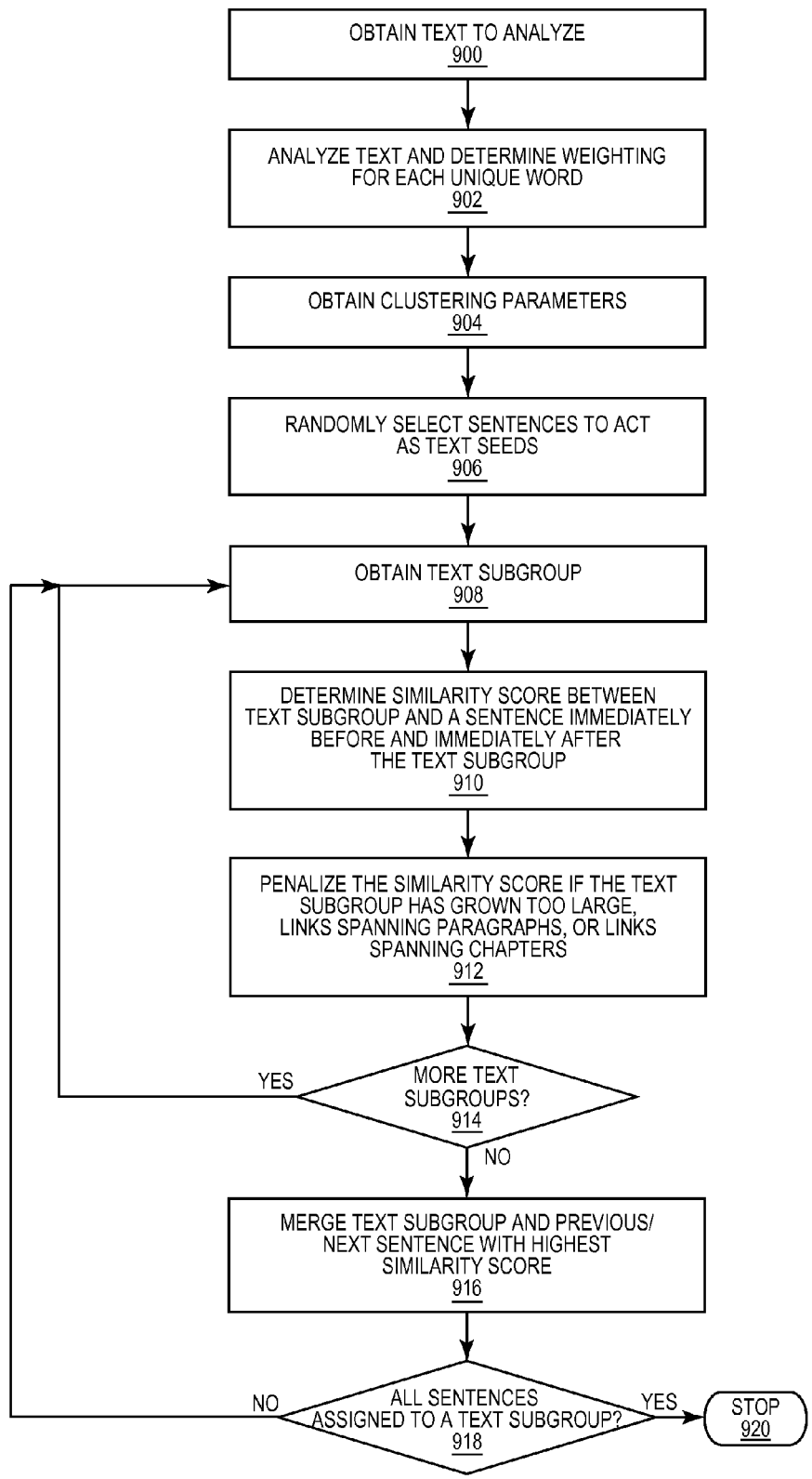
FIG. 9 illustrates a flow chart of an exemplary method of clustering text within an electronic text based on a similarity relationship between adjacent sentences in accordance with embodiments of the present disclosure.

In accordance with embodiments of the present disclosure, FIG. 9 illustrates a flow chart of an exemplary method of clustering text within an electronic text based on a similarity relationship between adjacent sentences. The method of FIG. 9 may be implemented by the e-book server 106 or one of the e-book readers 102 and 104. Referring to FIG. 9, the method includes obtaining text to analyze (step 900). For example, the e-book server 106 may obtain text of an e-book.

The method of FIG. 9 includes analyzing the text and determining weighting for each unique word (step 902). For example, the server 106 analyzes the text for determining the word frequency for each word occurring in the e-book (i.e., determining "term frequency"). For each word occurring in the text, the server 106 determines word weighting by multiplying the term frequency by the inverse document frequency to give a TF.IDF measure. In an embodiment, other variations of TF.IDF may be used, such as one determined by multiplying by the term frequency by the logarithm of the inverse document frequency. The inverse document frequency may be determined by counting the number of times a word occurs in a large number of documents. These frequencies may be determined separately for different specific domains or genres (e.g., suspense novels may have very different significant terms than romance novels, or technical documents on audio processing may have very different significant terms than books on archaeology). Either manual input in the form of tags and metadata, or suitable automated techniques, may be used to detect the domain a document's contents belong to, and to determine the appropriate significant terms for it. Example common words include, but are not limited to, the words the, of, to, in, a, is, that, be, it, by, are, for, was, as, he, with, on, his, at, which, but, from, has, this, will, one, have, not, were, or, all, their, an, I, there, been, many, more, so, when, had, may, today, who, would, time, we, about, after, dollars, if, my, other, some, them, being, its, no, only, over, very, you, into, most, than, they, day, even, made, out, first, great, must, these, can, days, every, found, general, her, here, last, new, now, people, public, said, since, still, such, through, under, up, war, well, where, while, years, before, between, country, debts, good, him, interest, large, like, make, our, take, upon, and what. Such common words, also known in NLP as "stop words", may be given very low significance when attempting to identify if two word fragments are related. Words corresponding to persons, places, or things occurring in the text of an e-book may be given additional weighting. For example, the names of the characters in a story may be given significance when trying to identify whether two word fragments are related. As described previously, such words may be identified using methods such as named entity recognition, along with heuristic methods based on the text, such as by assuming words that are consistently capitalized throughout the text to be named entities. In addition, other methods previously described may also be used, such as tokenizing, POS-tagging, stemming, co-reference resolution, and the like.

The method of FIG. 9 includes obtaining clustering parameters (step 904). For example, the server 106 may obtain clustering parameters that include variables such as, but not limited to, minimum cluster size, names of characters, places, and things, penalty weights for clustering across programs and chapters, and the like.

The method of FIG. 9 includes randomly selecting sentences to act as text seeds (or clustering seeds) (step 906). For example, the server 106 may determine initial text seeds by randomly selecting sentences from the text of the e-book. In another embodiment, a semantic relevance score may be assigned to sentences, and the seed sentence may be selected based on this score. In an embodiment, a sentence may be selected as a text seed based on its position within the text of the e-book. It is noted that the text clusters generated may be affected by the selection of the text seed.

The method of FIG. 9 includes obtaining a text subgroup (step 908). For example, a text seed may be obtained to function as an initial text subgroup. Subsequently, the method of FIG. 9 includes determining a similarity score between the text subgroup and a sentence immediately before and immediately after the text subgroup (step 910). For example, the server 106 may determine a similarity score or other semantic relationship between the text subgroup and a sentence immediately before and immediately after the text subgroup. The method of FIG. 9 includes penalizing the similarity score if the text subgroup has grown too large, links spanning paragraphs, or links spanning chapters (step 912). The method of FIG. 9 also includes determining whether the text includes more subgroups (step 914). For example, the server 106 may determine whether there is another text subgroup to analyze. If there is another text subgroup, the method may proceed to step 908 for application of steps 910 and 912 to the other text subgroup. These steps may be repeated until there are no additional text subgroups for analysis.

The method of FIG. 9 includes merging the text subgroups one-by-one with a previous or next sentence that has the highest similarity score to form a modified text subgroup (step 916). For example, the server 106 may determine, for a given text subgroup, which of the sentences adjacent to it has the highest similarity score. The sentence having the highest similarity score is merged to the text subgroup to form the modified text cluster. In an embodiment, if both sentences have a similarity score above a threshold level, both sentences may be merged with the text cluster to form a modified text subgroup. Conversely, if one or both of the sentences have a similarity score below a threshold level, neither sentence may be merged into the text subgroup.

Figure 10:
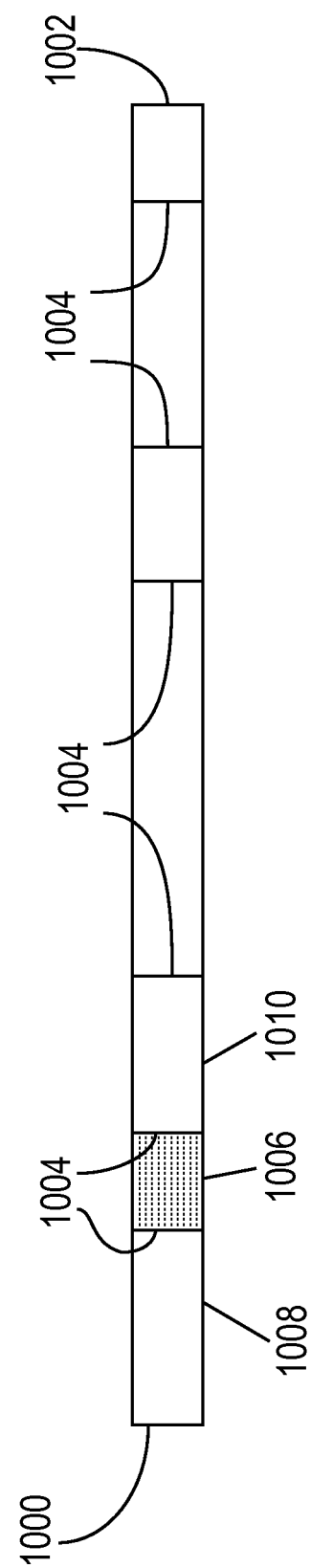
FIG. 10 illustrates a diagram depicting a clustering process for an electronic text in accordance with embodiments of the present disclosure.

In an example, FIG. 10 illustrates a diagram depicting a clustering process for an electronic text in accordance with the present disclosure. Referring to FIG. 10, the content of the electronic text is represented as beginning at an end 1000 and ending at an opposing end 1002. Text subgroups are shown as being divided by vertical lines 1004. In this example, a similarity score is determined between text subgroup 1006 and the text subgroup 1008 positioned before it. Also, a similarity score is determined between the text subgroup 1006 and the text subgroup 1010 positioned after it. The text subgroup 1006 is combined with the text subgroup 1008 or 1010 having the highest similarity score to form a modified text cluster.

The method of FIG. 9 includes determining whether all sentences have been assigned to at least one cluster (step 918). In response to determining that all sentences have not been assigned to a cluster, the method proceeds to step 908 until all sentences have been merged with a text cluster. In response to determining that all sentences have been assigned to a cluster, the method may stop (step 920). If there are un-assigned sentences remaining, the method may repeat. In one embodiment, the next seed text for subsequent iterations may be selected from the remaining unassigned sentences by selecting: an adjacent unassigned sentence; an unassigned sentence with the highest semantic relevance score; an unassigned sentence that is centrally located within a contiguous set of unassigned sentences; an unassigned sentence that is within a threshold range of distance from the one or more previously selected text seeds; an unassigned sentence that is within a threshold range of semantic or similarity difference from the one or more previously selected text seeds; or combinations thereof. It is noted that sentences may not always be exclusive to a single text cluster, and hence some sentences may be common to two adjacent text clusters. Further, as mentioned previously, the method of FIG. 9 may be applied recursively to text clusters to generate text sub-clusters so as to enable, for example, hierarchical organization and navigation.

Figure 11:
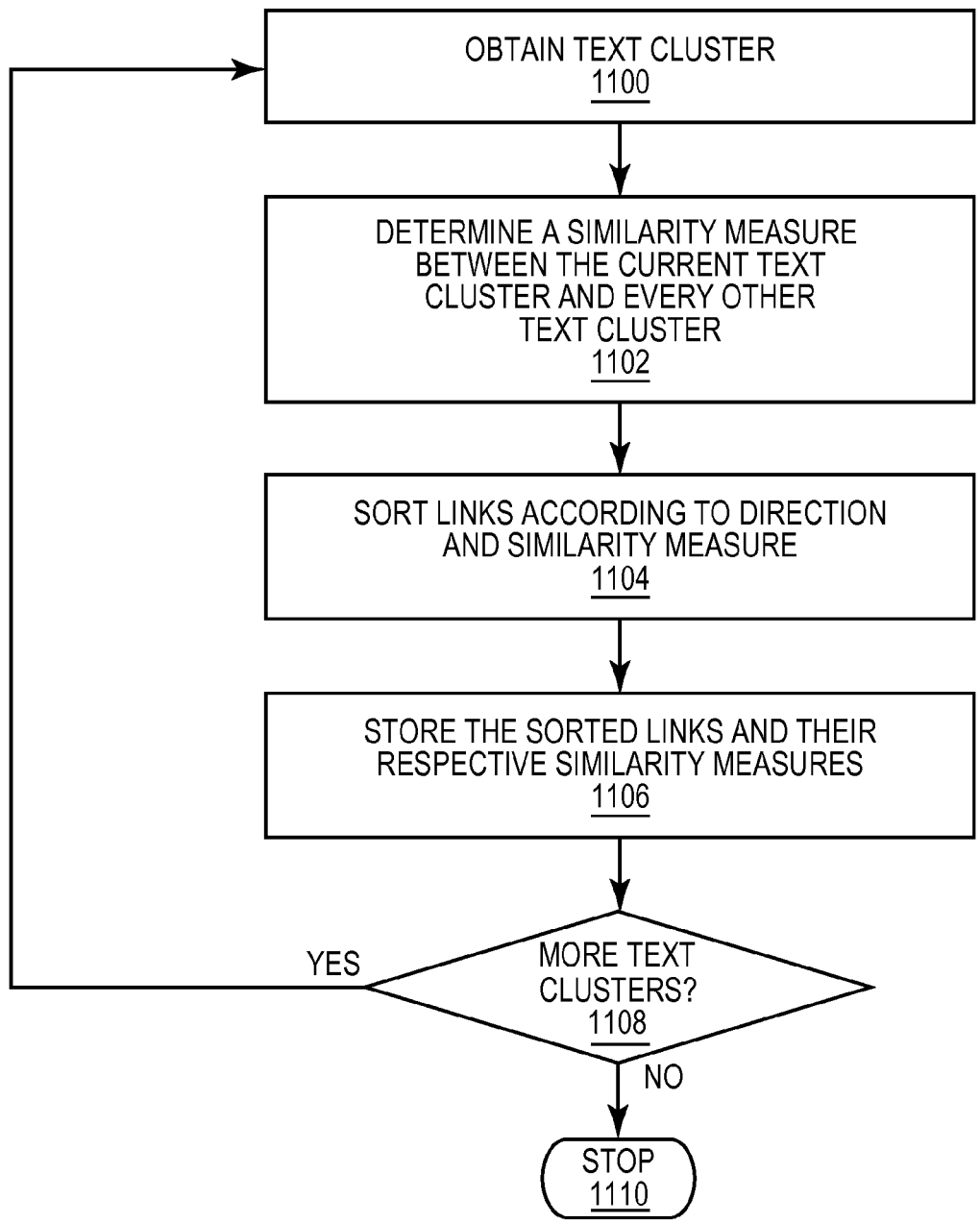
FIG. 11 illustrates a flow chart of an exemplary method of assigning forward and backward links for each text cluster of an electronic text in accordance with embodiments of the present disclosure.

Subsequent to associating all portions of the electronic text with a text cluster, forward and backward links may be assigned for each text cluster. In accordance with embodiments of the present disclosure, FIG. 11 illustrates a flow chart of an exemplary method of assigning forward and backward links for each text cluster of an electronic text. The method of FIG. 11 may be implemented by the e-book server 106 or one of the e-book readers 102 and 104. Referring to FIG. 11, the method includes obtaining a text cluster (step 1100). For example, the e-book server 106 may obtain one of the text clusters generated in the method of FIG. 9.

The method of FIG. 11 includes determining a similarity measure between the current text cluster and every other text cluster (step 1102). A similarity measure may be determined using any of the methods described previously, such as tokenizing, POS-tagging, named entity recognition, stemming, weighting, vector space modeling, latent semantic analysis, parsing, relation extraction, and the like. These similarity measures are associated with the corresponding links between the pair of text clusters. Subsequently, the links are sorted according to direction and similarity measure (step 1104). For example, for each text cluster, forward links are sorted according to the similarity measure or score and direction. In addition for each text cluster, for example, backward links are sorted according to the similarity measure or score and direction. Further, the sorted links and their respective similarity measures are stored (step 1106). As described previously, the most relevant terms common to the related text clusters, along their corresponding POS types, named entity types and ISTSV scores, may also be stored along with the links.

Figure 12:
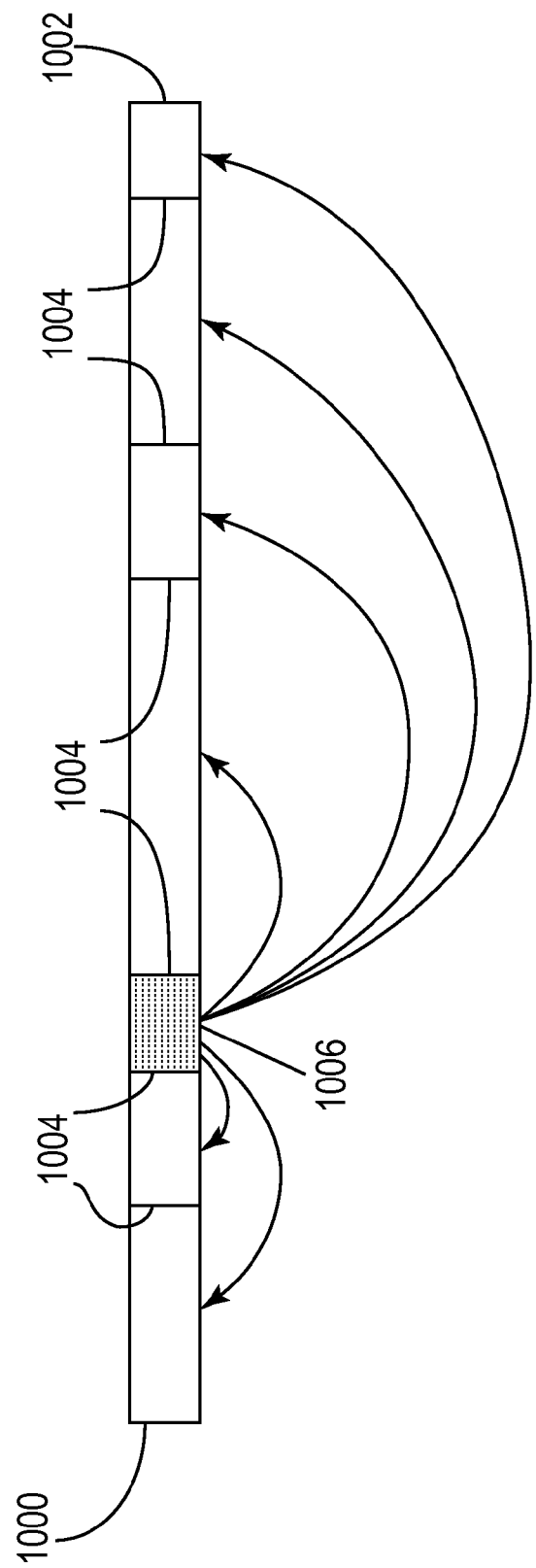
FIG. 12 illustrates the diagram shown in FIG. 10 in which a process for linking a text cluster is implemented in accordance with embodiments of the present disclosure.

FIG. 12 illustrates the diagram shown in FIG. 10 in which a process for linking the text cluster 1006 is implemented in accordance with embodiments of the present disclosure. Referring to FIG. 12, the text subgroup 1006, which is defined as a text cluster in this example, is compared to all other text clusters to determine the forward and backward links with the highest similarity, or lowest distance. In an embodiment, text clusters that are adjacent or within a threshold distance of each other are not compared, to avoid generating links to nearby text clusters for reasons described previously.

The method of FIG. 11 includes determining whether there are more text clusters (step 1108). If there are more text clusters, the method continues to step 1100 to obtain another text cluster. Thus, the steps 1102, 1104, and 1106 are implemented for all text clusters in the electronic text. If there are no more text clusters, the method stops (step 1110). In an example, this link information for each text subgroup may be stored as metadata in the data store 120.

Figure 13:
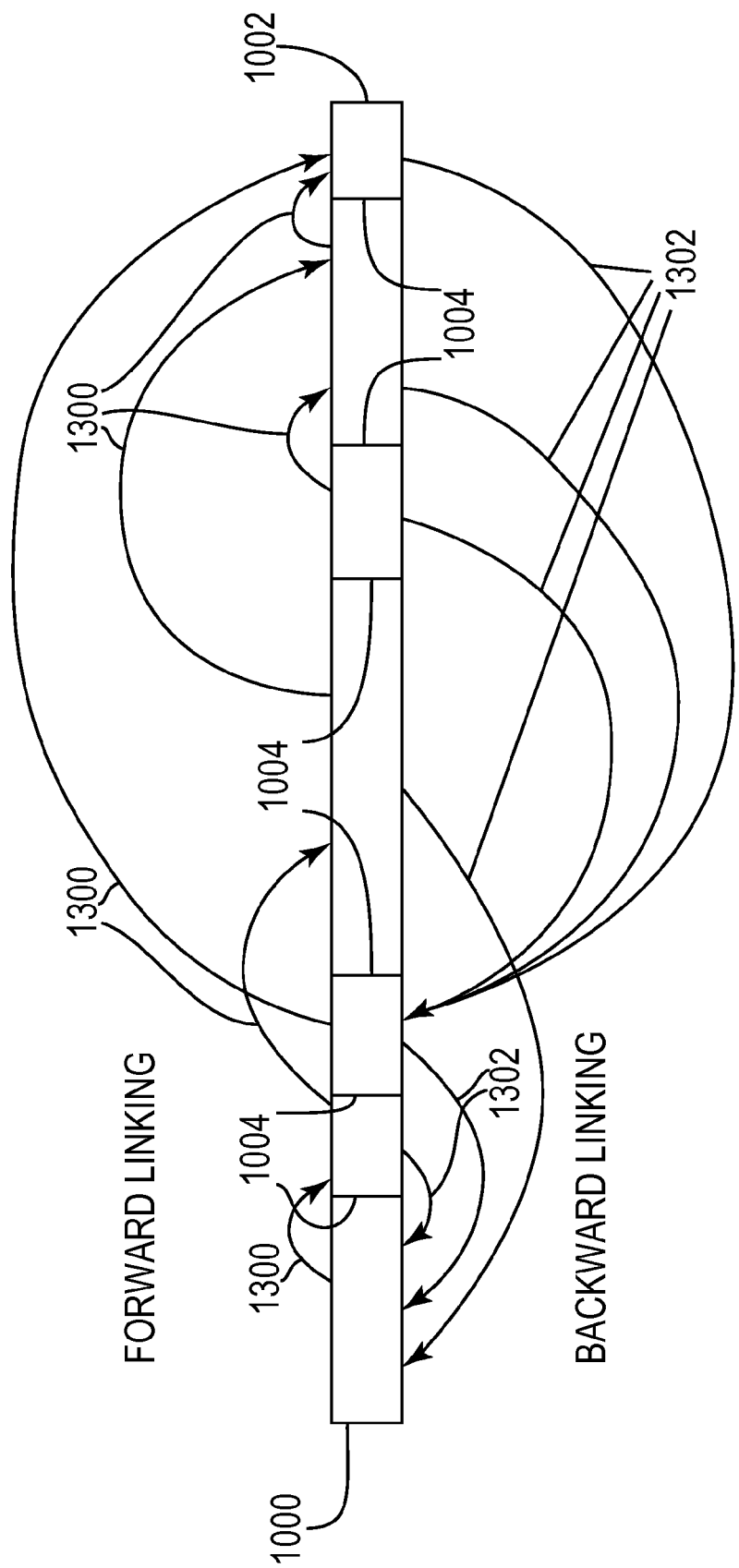
FIG. 13 illustrates the diagram shown in FIGS. 10 and 12 in which all links for all text clusters have been completed in accordance with embodiments of the present disclosure.

FIG. 13 illustrates the diagram shown in FIGS. 10 and 12 in which all links for all text clusters have been completed in accordance with embodiments of the present disclosure. Referring to FIG. 13, the arrows 1300 indicate the forward link from a text cluster to the forward text cluster having the highest similarity score. The arrows 1302 indicate the backward link from a text cluster to the backward text cluster having the highest similarity score. It is noted that a graphic representation of relations between text clusters similar to that in FIG. 13 may be generated dynamically using computer graphics methods and presented to a user to illustrate the inter-relationships between various segments of the text.

Figure 14:
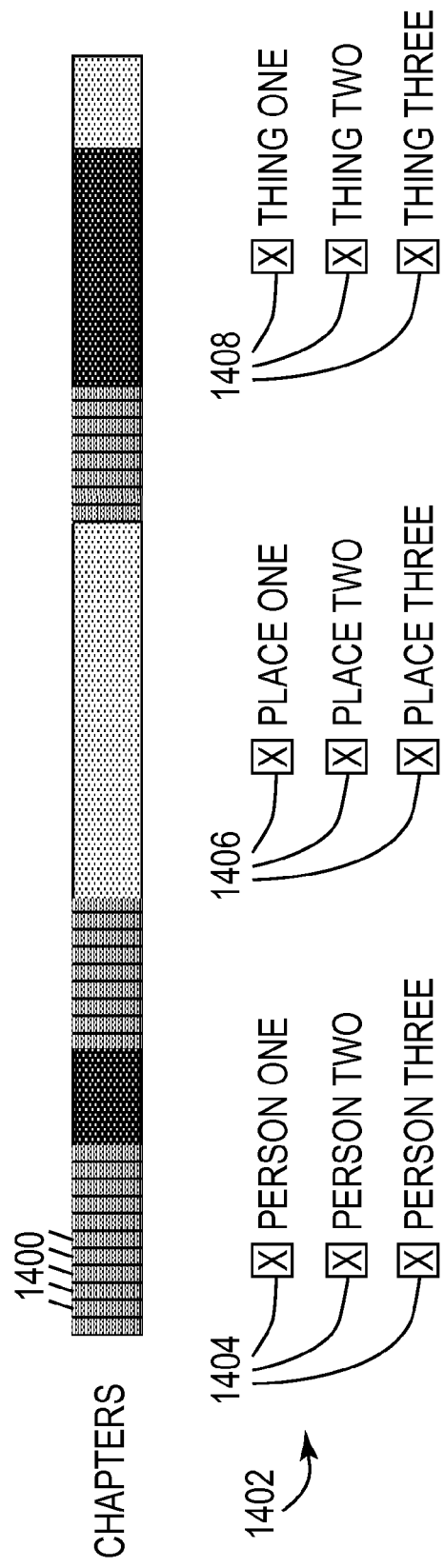
FIG. 14 illustrates a diagram depicting a heat map of an e-book in accordance with embodiments of the present disclosure.

In accordance with embodiments of the present disclosure, FIG. 14 illustrates a diagram depicting a heat map of an e-book. The diagram may be displayed by a display of an e-book reader or another suitable electronic device. Referring to FIG. 14, the diagram depicts chapters 1400 of the e-book and search criteria 1402 for selection by a user. The user may interact with a user interface of the e-book reader for selecting boxes 1404 corresponding to persons, boxes 1406 corresponding to places, and boxes 1408 corresponding to things. The candidate search criteria presented in boxes 1404, 1406 and 1408 may be determined either through manual input, such as by an author, editor, publisher or user, or may be automatically generated using methods such as named entity recognition. The displayed heat map can changed based on the selection of the boxes 1404, 1406, and 1408. It is noted that the method may automatically filter candidate search criteria whose selection may have limited or less meaningful effects on the heat map. For example, the main protagonist in a novel, who may be referenced in every chapter, may not be a useful search criterion, since selecting that criterion may uniformly affect the entire heat map displayed and may not aid a user in isolating relevant chapters. The search criteria corresponding to the selected boxes are used for determining a similarity with each chapter 1400. For example, a similarity score can be generated for each chapter. Further, each chapter can be colored based on its respective similarity score. In this way, a user can view the colors of the chapters 1400 to determine a relevancy of the chapter to the selected search criteria. In addition, the user may interact with the displayed graph to select a chapter. In response to selection of the chapter, the e-book reader may display the selected chapter's content.

Figure 15:
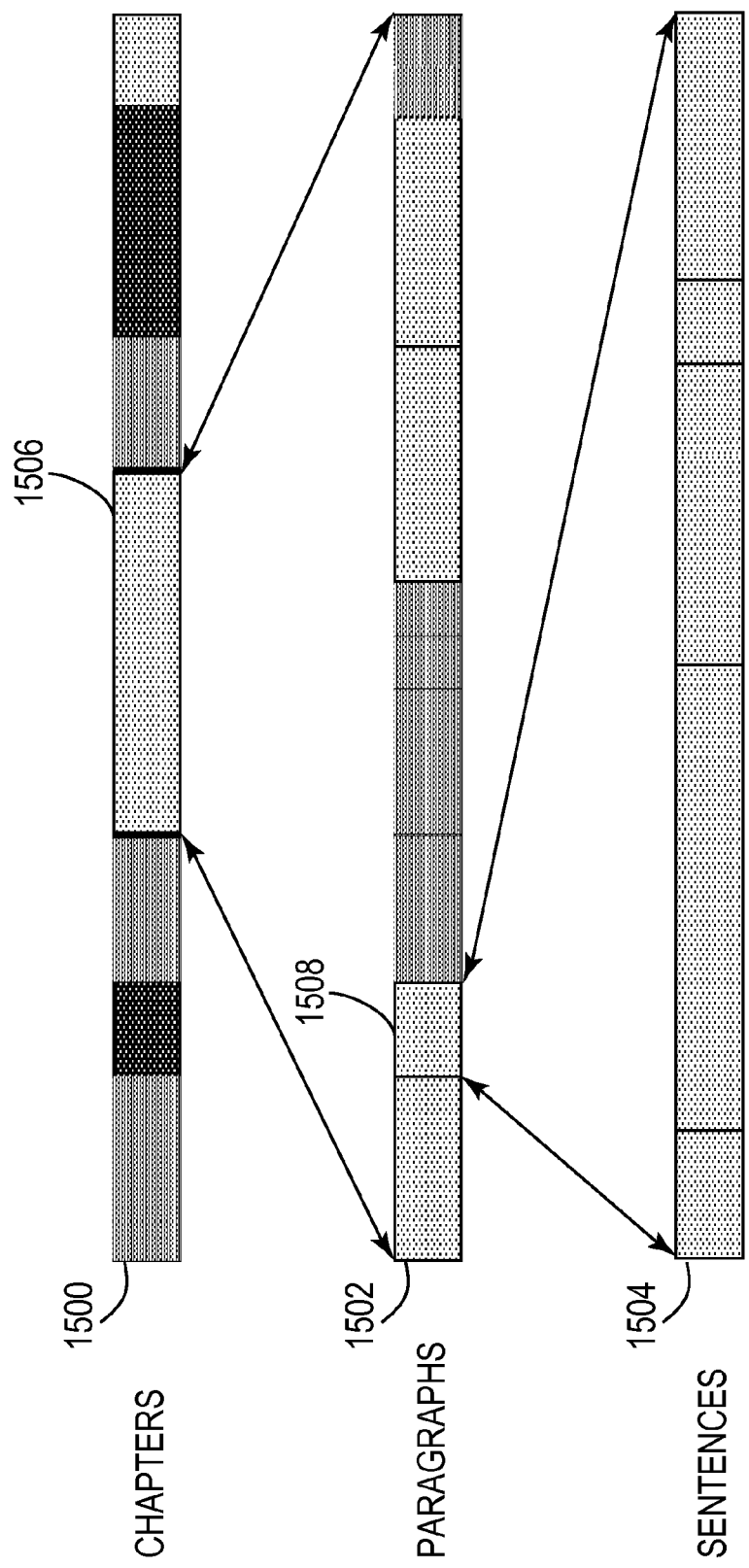
FIG. 15 depicts diagrams of heat maps for hierarchical navigation of an e-book in accordance with embodiments of the present disclosure.

In accordance with embodiments of the present disclosure, a hierarchical search or navigation method may be implemented to allow a user to visually identify sections of relevant text based on one or more search criteria. A user may specify search criteria, for example by keyboard input, selecting sections of displayed text, or selecting from a pre-determined list of search criteria. In response to specifying the search criteria, a visual indication of relevant chapters, paragraphs, and sentences may be presented as shown in diagrams 1500, 1502, and 1504 of FIG. 15, which illustrates diagrams of heat maps for hierarchical navigation of an e-book. The portions of each of diagrams 1500, 1502, and 1504 may be colored differently for visually indicating a relevancy of that particular portion of the e-book. In this example, the user may select a chapter 1506 to further pinpoint relevant paragraphs 1502 as shown in the diagram. Further, the user may select a paragraph 1508 to further pinpoint relevant sentences 1504 as shown in the diagram. In an embodiment, this hierarchical navigation or search structure may be determined by recursive application of the clustering method. In another embodiment, the hierarchical navigation or search structure may be determined by recursively determining semantic relation of the search criteria to smaller text subgroups contained within a selected text cluster.

In accordance with embodiments of the present disclosure, a user may interact with a user interface with an electronic device as disclosed herein for utilizing navigation links to access content in an electronic text that is related to currently-displayed content. For example, a user may interact with the display 200 shown in FIG. 2 to select the phrase 202 for displaying content having a semantic relationship to the phrase 202. In an example, the phrase 202 and its surrounding area may appear similar to other displayed text unless the phrase 202 is "clicked upon" or "moused over." Thus, in this example, the navigational link associated with the phrase 202 remains invisible until interacted with by user input. The linked-to portion of the electronic text may be "zoomed in" on or otherwise highlighted for distinguishing it from other portions of the electronic text.

In accordance with an embodiment of the present disclosure, a user may navigate through text related to a navigation link by making backward and forward flipping motions on a display. For example, the user may touch the display 200 shown in FIG. 2 to make flipping motions over the phrase 202 to navigate back and forth through text related to the phrase 202. Alternate touch gestures for navigation may include, for example, a counter-clockwise circle or semi-circle for backward navigation, or jumping to backward links, either to the most relevant segment or the closest relevant segment before the current displayed segment; a clockwise circle or semi-circle for forward navigation, or jumping to forward links, either to the most relevant segment or the closest relevant segment after the current displayed segment; and so on. These gestures may be reversed, or more intuitive ones chosen, for Japanese, Chinese, Arabic text and the like. The device may also provide, or the user may also configure, specific gestures for specific navigations. In an example, the user may return to the original text by appropriate interaction with the display 200 such as by, for example, a single click, tap, or touch screen gesture on the display 200.

In an example use of an electronic device disclosed herein, a user may be reading an e-book residing on an e-book reader such as the e-book reader 102 shown in FIG. 1A. During reading, the user may become confused as to the subtleties of the story. The user may select a passage explaining, for example, the inter-contradictory rules that make up the story. At each sentence, the user may interact with the user interface 112 to select one or more words. The electronic text manager 108 may receive the selected word(s) and, in response to receipts of the word(s), it may control the user interface 112 to display a timeline of passages deemed to be related to the selected word(s). As the user selects additional words and/or phrases, the timeline may be updated to show new related passages. Further, for example, the user may interact with the display of the e-book reader 102 for indicating that he or she wants a "semantic replay" related to the selected word(s). In response, the e-book reader 102 may, for each selected word or phrase, navigate to a previous passage that illustrates how that rule affects another character.

In another example use of an electronic device disclosed herein, a user may be reading an e-book residing on an e-book reader such as the e-book reader 102 shown in FIG. 1A. In this example, the user may be interested in a character mentioned early in the story. Near the end of the story, the character is mentioned again. By this time, the user may have forgotten a detail about the character. As a result, the user may interact with a portion of the display including text about the character (e.g., "tapping" on the display at a pronoun referring to the character). In response to receipt of the user input, the electronic text manager 108 may control the display to navigate to the introduction of the character within the story. The user may then interact with the display (e.g., by double tapping a portion of the display) to return to the previous position in the story.

In another example use of an electronic device disclosed herein, a user may be reading an e-book residing on an e-book reader such as the e-book reader 102 shown in FIG. 1A. In this example, the user is interested in finding all instances in an e-book where a particular character has dialog. The user may select a graphic for selecting all of the character's dialog. In response to the selection, the electronic text manager 108 may control a display of the e-book reader 102 to display dialog metadata provided by the e-book publisher for identifying all dialog attributed to the selected character. In addition, the electronic text manager 108 may control the display to display a navigation control graphic including a dynamic semantic timeline of where the character's dialog appears in the e-book. The user may interact with the control graphic for navigating to a portion of the book where specific dialog appears.

Figure 16:
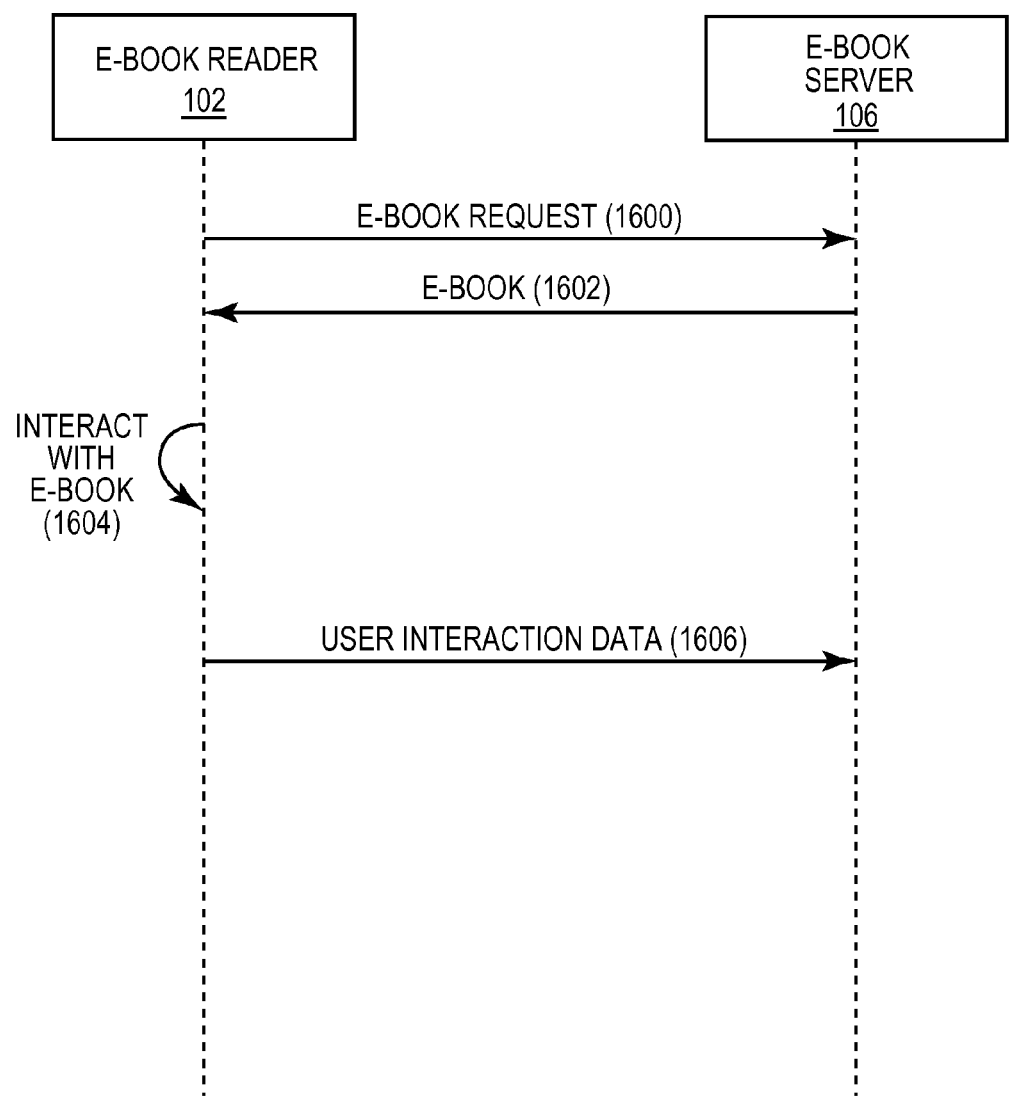
FIG. 16 illustrates a message flow diagram of an exemplary operation of the system shown in FIG. 1 in accordance with embodiments of the present disclosure.

FIG. 16 illustrates a message flow diagram of an exemplary operation of the system 100 shown in FIG. 1A in accordance with embodiments of the present disclosure. Referring to FIG. 16, the e-book reader 102 may communicate to the e-book server 106 a request for an e-book (step 1600). For example, a user of the e-book reader 102 may view a displayed listing of e-books available from the e-book server 106. The user may interact with the user interface 112 for selecting one of the e-books. In response to the selection, the e-book reader 102 may generate a message including an identifier of the e-book and may communicate the message to the e-book server 106 via the network 116. The message may also include account information of the user.

The e-book server 106 may receive the message communicated in step 1600. In response to receipt of the message, the e-book server 106 may verify user account information for selecting the identified e-book. The user account information may be compared with data stored in user accounts 130. In an example, the account information may be used for conducting a purchase transaction for the identified e-book. In response to verifying the user account information, the e-book server 106 may download the e-book to the e-book reader 102 via the network 116 (step 1602).

The e-book reader 102 may receive the e-book. Subsequent to receipt of the e-book, the e-book may be stored in the data store 110. Further, the user may interact with the user interface 112 to open the e-book for reading. The electronic text manager 108 may display content of the e-book. The user may interact with the e-book by use of the user interface 112 (step 1604). For example, the interaction may include non-linear navigation between text subgroups with the electronic text in accordance with the present disclosure. Data of such interaction with the e-book may be stored in the data store 110. Further, the electronic text manager 108 may communicate the user interaction data to the e-book server 106 (step 1606). In response to receipt of the user interaction data, the e-book server 106 may infer semantic relation between and link text subgroups of the e-book in accordance with the present disclosure. The link data may be stored in the data store 120 as metadata 124 for the e-book for distribution to other e-book readers in accordance with the present disclosure. The link data may also be provided as it is generated to other devices 104 that may already contain pre-distributed copies of the same e-book.

Some or more of the embodiments disclosed herein, such as for clustering text subgroups and creating navigation links between text subgroups based on similarity relationships, historical user navigation behavior and heuristic direct reference-based linking, and the like, may also be applicable across multiple documents or related e-books. For example, it may be applied in scenarios in which the documents belong to the same series, or are otherwise strongly related to each other (for example, the Harry Potter series). In an embodiment, to achieve this, the texts and other content of each document may be appended in the appropriate sequence to form one large text, and the clustering and linking methods described above may be applied to the combined text as a whole. The resulting text clusters, text groups, text subgroups and the navigation links between them may be tagged to identify the corresponding documents they occur in, and the electronic text manager 108 may store this information along with metadata, such as in the form of a markup language, indicating the boundaries of each constituent document, such that when presenting an e-book, only the contents of the e-book being currently used are presented to the user. However, when the user wishes to navigate to a related text subgroup that is located in another document, the electronic text manager 108 may use this information to access the relevant document and present the text subgroup to which the user has navigated.

When applying clustering to the combined text, it may not be desirable for clusters to be formed across constituent document boundaries, since typically the combined document will not be presented to the user. In an embodiment, clusters may be prevented from forming across constituent document boundaries, for example, by applying a very large penalty for crossing document boundaries. In another embodiment, clusters may be allowed to form across document boundaries, and these clusters may be used for the purpose of creating navigation links, but any such clusters may be separated at these boundaries when presenting the individual constituent documents.

Combining multiple texts and processing as a single text, however, may result in anomalies, such as, for example, chapter numbers being repeated in the combined text. This may result in errors, for instance, when performing heuristic direct reference-based linking. As an example, if a sentence in the third book in a series refers to "chapter 2", it most probably refers to chapter 2 of the third book, but while processing the combined text, the electronic text manager 108 may confuse this reference with the chapters 2 in the first and second book of the series. To address this problem, in an embodiment, before combining the constituent texts into the combined text, the electronic text manager 108 may identify any chapter numbers, section numbers, figure numbers, headings, titles or other such directly reference-able material occurring in each text, tag them with the identifier of the document in which they occur, and use the tagged reference-able material when processing the combined text. Tagging may be performed, for example, using markup methods. If the reference-able material is already tagged, the existing tags are updated to include the document identifier. Thus, when the electronic text manager 108 applies any of the previously discussed methods to the combined text, it may refer to the document identifier tags and is aware of the corresponding document in which any given section of the text belongs, and hence is able to resolve references correctly. In an embodiment, while processing the combined text, the electronic text manager 108 keeps track of the constituent document to which a current text segment belongs, for example, by comparing the location of the current text segment with the boundary locations of the constituent documents in the combined text. Subsequently, if a current text segment being processed contains a direct reference, the electronic text manager 108 may assume that the reference is within the context of the document to which the current text segment belongs, and hence when creating a navigation link, it links to the corresponding directly-reference-able material that is tagged with the identifier of the current document. It is noted that the combining and the tagging is performed mainly for the benefit of the electronic text manager 108, and may not be presented to the user, especially since the combined document is typically not presented to the user in the first place.

In an embodiment, when processing references in the combined text, the electronic text manager 108 may also check whether the directly referencing text has any context that further qualifies the reference-able segment (e.g., chapter number, section number or figure number) it is referencing, and may use the qualifying information to more accurately resolve the reference. As an example, if a referencing text says only "chapter 2," the electronic text manager 108 may assume it is a reference to chapter 2 in the same document, but if the referencing text qualifies it further, such as saying "chapter 2 of Volume II," it uses the qualifying information "of Volume II" to more accurately identify that the reference is to a chapter in another document (in this case, "Volume II"). In another embodiment, the electronic text manager 108 may also use contextual information in the text surrounding the direct reference to more accurately resolve the reference in the combined text. For example, if the direct reference to "chapter 2", is in context to "caterpillars becoming butterflies", the electronic text manager 108 checks the chapter 2 of each constituent document of the combined text to detect a similarity relationship, such as whether each chapter 2 contains text about caterpillars becoming butterflies, and may hence create a link to the chapter with the strongest similarity relationship.

It is noted that processing multiple texts as a single combined text may create navigation links between text subgroups across two or more documents, some of which may not be available to the user (for example, to a user who has not purchased a particular e-book in a series). As such, the electronic text manager 108 may have access to ownership information that specifies the books that the user owns, or otherwise may have access to (such as through loaning from a friend). Thus, the electronic text manager 108 may also be aware of the books to which the user does not have access, but to which some navigation links from the books accessible to the user point. When presenting semantic navigation links, the electronic text manager 108 may hence filter the links that point to text subgroups in books to which the user does not have access.

In another embodiment, the electronic text manager 108 may determine such navigation links, present them to the user and deny the user from using them to navigate, but may provide information such as the title, author, cover art, and the like about the relevant document(s) to which these links point. In an embodiment, the electronic text manager 108 may also provide an interface to purchase or otherwise access the relevant document(s) containing the text subgroups to which the links point. An exemplary interface to purchase the document containing the linked text subgroup may include a link to one or more online e-book stores that may have the document. Another exemplary interface may include a user interface (UI) element, such as a button, to directly purchase the document via the user's credentials stored with one or more predetermined online e-book stores, for example, by using Amazon.com, Inc.'s 1-CLICK® purchase system. An exemplary interface for other methods of accessing the linked document, such as by borrowing, may include a list of the users' friends in a social network that own a copy of the linked document and are able to loan it. The user may be enabled to purchase, borrow or otherwise access the whole of the document or only a part of the document containing the linked text subgroup. Along with the interface to purchase, borrow or otherwise access the linked document, the electronic text manager may also include content from the document such as text previews, summaries and metadata such as user reviews. The user may be presented with an option to purchase, borrow or otherwise access the document in electronic or e-book form, or as a hard copy.

It is noted that the text subgroups in external documents pointed to by the semantic navigation link may in turn contain other semantic navigation links that point to other text subgroups in other documents to which the user may not have access. The electronic text manager 108 may determine that the user may also prefer to traverse those links, for example, based on a very strong similarity relationship or semantic relevance between the corresponding text subgroups, or alternatively, based on historical semantic navigation patterns of other users. In such cases, the semantic navigation links may be recursively traversed and chained based on similarity relationships and/or historical navigation behavior, and the resulting list of corresponding documents may be presented to the user to purchase, borrow, or otherwise access, and the user may choose to access all or only a subset of the list.

Figure 17:
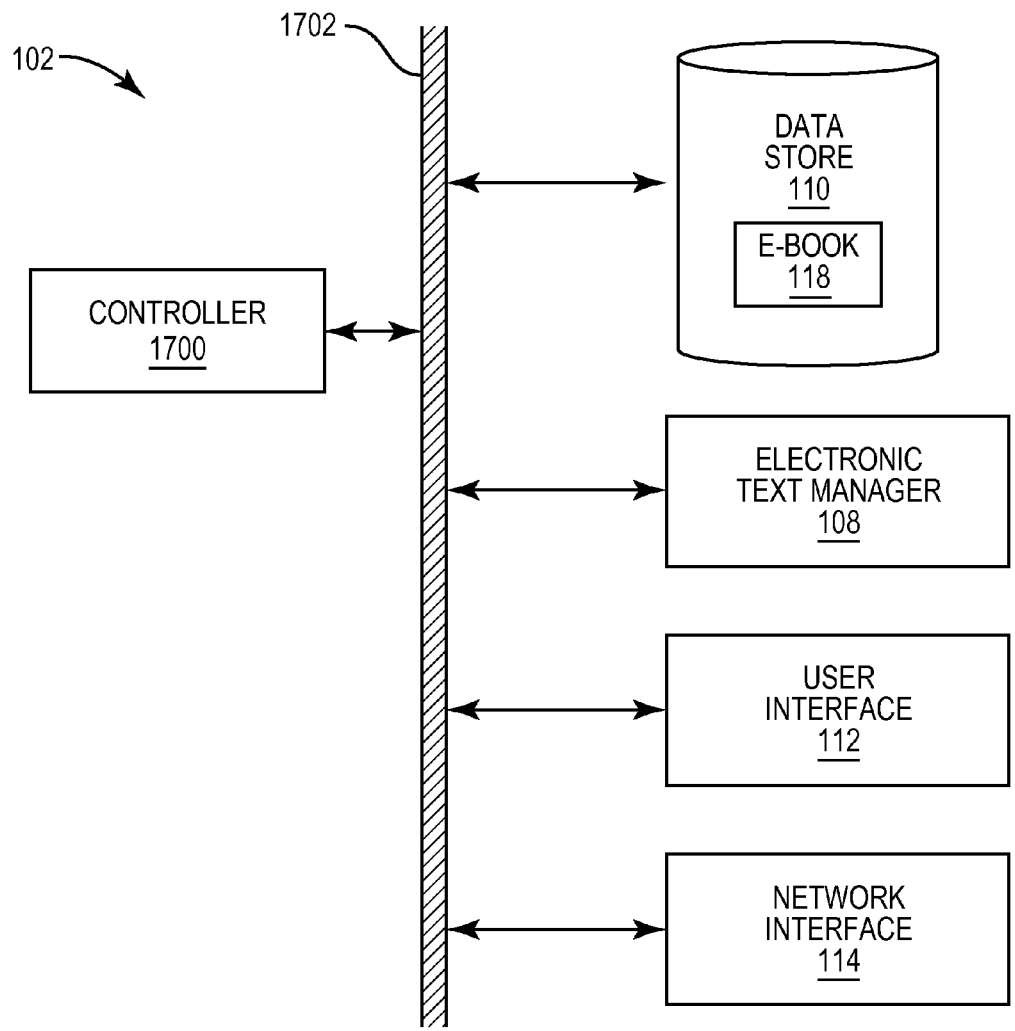
FIG. 17 is a block diagram of the e-book reader shown in FIG. 1 according to embodiments of the present disclosure.

FIG. 17 is a block diagram of the e-book reader 102 shown in FIG. 1A according to embodiments of the present disclosure. Referring to FIG. 17, the e-book reader 102 may include a controller 1700 connected to the data store 110, the electronic text manager 108, the user interface 112, and the network interface 114 by a bus 1702 or similar mechanism. The data store 110 may store e-books such as the e-book 118. The controller 1700 may be a microprocessor, digital ASIC, FPGA, or the like. In this example, the controller 1700 is a microprocessor, and the electronic text manager 108 is implemented in software and may be stored in a suitable memory or data store. The network interface 114 may be a local wireless interface such as a wireless interface operating according to one of the suite of IEEE 802.11 standards, a mobile communications interface, or the like. The user interface 112 may include, for example, a touchscreen, a display, one or more user input components (e.g., a keypad), a speaker, or the like, or any combination thereof.

Figure 18:
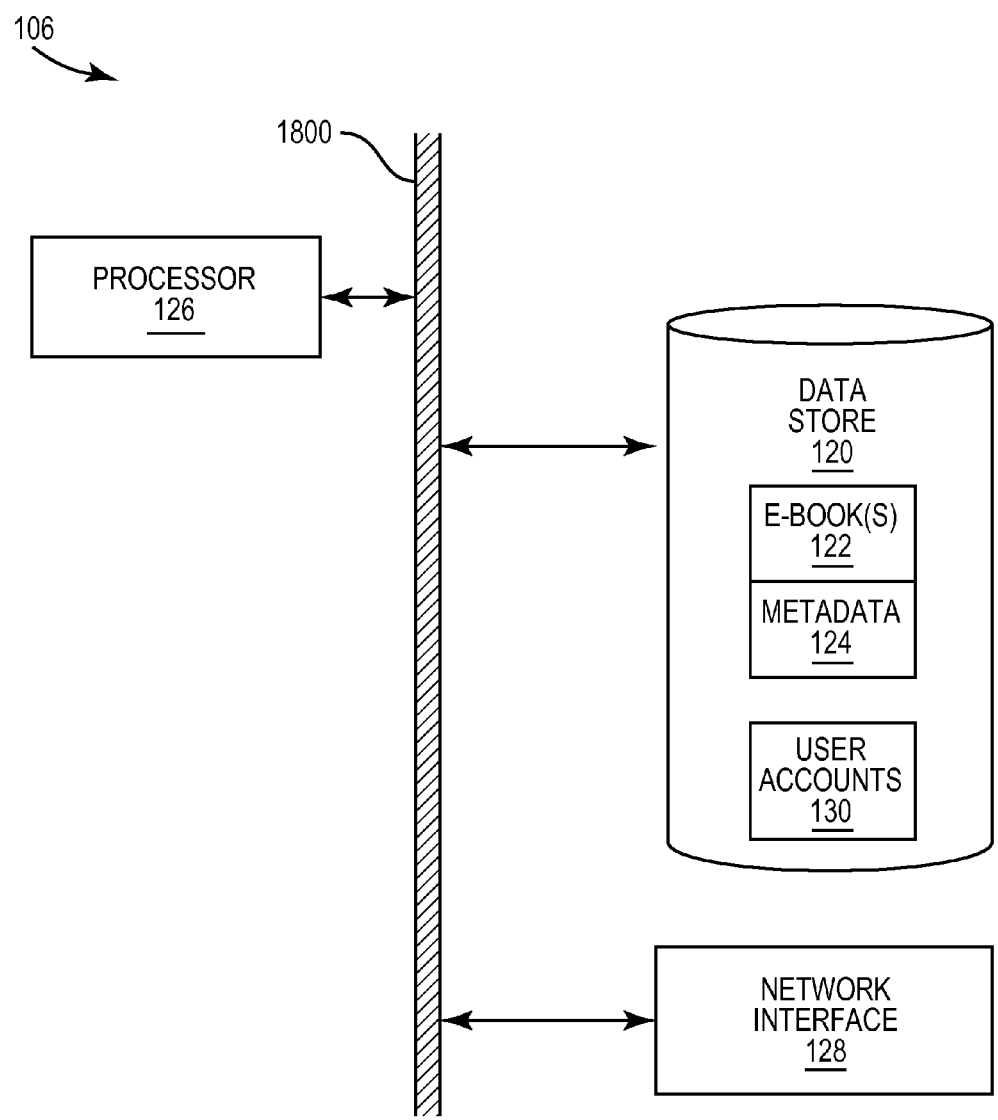
FIG. 18 is a block diagram of the e-book server shown in FIG. 1 according to embodiments of the present disclosure.

FIG. 18 is a block diagram of the e-book server 106 shown in FIG. 1A according to embodiments of the present disclosure. Referring to FIG. 18, the server 106 may include the processor 126, which is connected to the data store 120 and the network interface 128 by a bus 1800 or similar mechanism. The data store 120 may include the e-book(s) 122, the metadata 124, and the user accounts 130. The processor 126 may be implemented as software suitably stored in memory and executable by a processor. The processor 126 may be configured to implement one or more functions described herein. The processor may be a microprocessor, digital ASIC, FPGA, or the like. In this example, the processor is a microprocessor. The network interface 128 may be a local wireless interface such as a wireless interface operating according to one of the suite of IEEE 802.11 standards, a mobile communications interface, or the like.

As described earlier, applying these methods to an electronic text results in metadata specifying text clusters and semantic navigation links. In an embodiment, this metadata may be provided within the electronic text, for example in the form of a markup language. In an embodiment, this metadata may be provided separately from the text, for example, as records in a separate metadata file, which may enable the metadata to be stored separately from the electronic text. Alternately, for example, the metadata may be provided in part within the electronic text and in part separately from the electronic text. An e-book provider, such as an online e-book store, may choose to conditionally provide such metadata for an e-book, for example, for a higher price.

In an embodiment, the metadata specifying text clusters and semantic navigation links for an e-book may be created through manual input instead of, or in addition to, the automated methods described above. Such manual input may be provided, for example, by the creators of the e-book, the author, the publisher and/or the editor. Interactive, GUI-based software tools may be used to aid manual input, such as specifying text cluster boundaries within an electronic text, and creating semantic navigation links by specifying the text clusters or subgroups which they link, along with ranking information and significant relevant terms for each link. In an embodiment, the metadata created by applying the automated methods may be reviewed and edited by human input. In another embodiment, the metadata created by human input may be used to supplement the metadata created by the automated methods. In another embodiment, the metadata created by human input may be used to influence the automated methods, and thus, the metadata they create. As an example, in the text clustering method, penalties applied during clustering may be adjusted based on whether the text subgroups occur at the boundaries of the clusters in the manually created metadata. As another example, semantic navigation links created by the linking method that also occur in the manually created metadata may be assigned a higher rank than other links, even though the automatically determined similarity relationship metrics may indicate otherwise.

The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the presently disclosed invention. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural, functional or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the presently disclosed invention. When implemented on a general-purpose processor, the program code combines with the processor to provide a unique apparatus that operates to perform the processing of the presently disclosed invention.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A method comprising:
   receiving, using a processor, an input identifying search criteria for searching an electronic text;
   determining, using the processor, text subgroups within the electronic text;
   selecting, using the processor, a text subgroup relating to a current user position within the electronic text and the search criteria;
   determining, using the processor, a similarity relationship between the search criteria and one or more text subgroups adjacent to the selected text subgroup;
   creating, using the processor, a text cluster by associating the search criteria with the one or more adjacent text subgroups based on the determined similarity relationship to the search criteria;
   determining, using the processor, an activity indication of times when a user has read other text subgroups within the electronic text;
   determining, using the processor, a similarity relationship between the text cluster and the other text subgroups;
   linking, using the processor, the text cluster to one of the other text subgroups based on the determined similarity relationship to the one of the other text subgroups; and
   presenting, using the processor, a graphic representing the similarity relationship between the one of the other text subgroups and the text cluster based on the activity indication of times when the user read the other text subgroups.

2. The method of claim 1, wherein receiving the search criteria comprises receiving identification of one of a person, place, and thing.

3. The method of claim 1, wherein receiving the search criteria comprises receiving one or more words.

4. The method of claim 1, wherein receiving the search criteria comprises receiving user input indicating the search criteria.

5. The method of claim 1, wherein determining the text subgroups comprises determining the text subgroups based on a similarity relationship of content contained within each text subgroup.

6. The method of claim 1, further comprising:
   associating the graphic with the one of the other text subgroups;
   receiving user input for selecting the graphic; and
   in response to receiving the user input, controlling a user interface to present content of the one of the other text subgroups associated with the selected graphic.

7. The method of claim 1, wherein determining the text subgroups comprises defining the text subgroups according to one of chapters, paragraphs, and sentences of the electronic text.

8. The method of claim 1, wherein determining the text subgroups comprises defining the text subgroups according to chapters and paragraphs of the electronic text,
   wherein the method further comprises:
      receiving user input for selecting a graphic associated with one of a chapter and paragraph;
      in response to receiving user input selecting the graphic associated with the chapter, presenting graphics representing relationships between the search criteria and paragraphs within the chapter; and
      in response to receiving user input selecting the graphic associated with the paragraph, presenting graphics representing relationships between the search criteria and sentences within the paragraph.

9. The method of claim 1, wherein determining the similarity relationship between the text cluster and the other text subgroups comprises determining a similarity score between the text cluster and the other text subgroups,
   wherein presenting the graphic comprises presenting the graphic as an indicator of the similarity score.

10. The method of claim 9, wherein the graphic includes a predetermined color that indicates the similarity score.

11. The method of claim 1, wherein determining the similarity relationship between the text cluster and the other text subgroups comprises one of performing semantic analysis, performing natural language processing, identifying causal relationships between the text seed and the text subgroups, determining semantic similarity based on ontology, using a semantic index to compare semantic similarities, and determining a statistic similarity.

12. The method of claim 1, wherein determining the similarity relationship between the text cluster and the other text subgroups comprises:
   using a semantic graph representing relations between words to compare the search criteria to one or more words in each of one or more adjacent text subgroups; and
   using the comparison to associate the search criteria with the one or more adjacent text subgroups.

13. The method of claim 12, further comprising generating the semantic graph using at least one of pre-generated summarization of the electronic text, metadata of the electronic text, semantic analysis of the electronic text, semantic indexing, natural language processing (NLP), and statistical techniques.

14. The method of claim 1, further comprising storing a navigational aid in metadata of the electronic text that indicates the similarity relationship between the text cluster and the other text subgroups.

15. An electronic device comprising:
an electronic document manager including at least a processor and memory configured to:
receive search criteria for searching an electronic text;
determine a current user position within the electronic text;
determine text subgroups within the electronic text;
select a text subgroup relating to the current user position within the electronic text and the search criteria;
determine a similarity relationship between the search criteria and one or more text subgroups adjacent to the selected text subgroup;
create a text cluster by associating the search criteria with the one or more adjacent text subgroups based on the determined similarity relationship to the search criteria;
determine an activity indication of times when a user has read other text subgroups within the electronic text;
determine a similarity relationship between the text cluster and the other text subgroups;
link the text cluster to one of the other text subgroups based on the determined similarity relationship to the one of the other text subgroups; and
a user interface configured to present a graphic representing the similarity relationship between the one of the other text subgroups and the text cluster based on the activity indication of times when the user read the other text subgroups.

16. The electronic device of claim 15, wherein the electronic document manager is configured to receive identification of one of a person, place, and thing.

17. The electronic device of claim 15, wherein the electronic document manager is configured to determine the text subgroups based on a similarity relationship of content contained within each text subgroup.

18. The electronic device of claim 15, wherein the electronic document manager is configured to:
associate the graphic with the one of the other text subgroups;
receive user input for selecting the graphic; and
control the user interface to present content of the one of the other text subgroups associated with the selected graphic in response to receiving the user input.

19. The electronic device of claim 15, wherein the electronic document manager is further configured to define the text subgroups according to one of chapters, paragraphs, and sentences of the electronic text.

20. A non-transitory computer-readable storage medium having stored thereon computer executable instructions for performing the following steps:
receiving search criteria for searching an electronic text;
determining a current user position within the electronic text;
determining text subgroups within the electronic text;
selecting a text subgroup relating to the current user position within the electronic text and the search criteria;
determining a similarity relationship between the search criteria and one or more text subgroups adjacent to the selected text subgroup;
creating a text cluster by associating the search criteria with the one or more adjacent text subgroups based on the determined similarity relationship to the search criteria;
determining an activity indication of times when a user has read other text subgroups within the electronic text;
determining a similarity relationship between the text cluster and the other text subgroups;
linking the text cluster to one of the other text subgroups based on the determined similarity relationship to the one of the other text subgroups; and
presenting a graphic representing the similarity relationship between the one of the other text subgroups and the text cluster based on the activity indication of times when the user read the other text subgroups.

* * * * *